US009159200B2

(12) United States Patent
Aoki

(10) Patent No.: US 9,159,200 B2
(45) Date of Patent: Oct. 13, 2015

(54) PROGRESSIVE WAGERING GAME HAVING SYMBOL-TRIGGERING AWARD FEATURE

(71) Applicant: WMS Gaming Inc., Waukegan, IL (US)

(72) Inventor: Dion K. Aoki, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/101,726

(22) Filed: Dec. 10, 2013

(65) Prior Publication Data

US 2014/0094266 A1 Apr. 3, 2014

Related U.S. Application Data

(63) Continuation of application No. 13/156,005, filed on Jun. 8, 2011, now Pat. No. 8,628,400.

(60) Provisional application No. 61/366,259, filed on Jul. 21, 2010, provisional application No. 61/405,935, filed on Oct. 22, 2010.

(51) Int. Cl.

| | |
|---|---|
| ***G06F 17/00*** | (2006.01) |
| ***G07F 17/34*** | (2006.01) |
| ***G07F 17/32*** | (2006.01) |

(52) U.S. Cl.

CPC ............ *G07F 17/34* (2013.01); *G07F 17/3262* (2013.01); *G07F 17/3267* (2013.01)

(58) Field of Classification Search

CPC .. G07F 17/34; G07F 17/3263; G07F 17/3267

See application file for complete search history.

(56) References Cited

U.S. PATENT DOCUMENTS 4,624,459 A 11/1986 Kaufman
4,837,728 A 6/1989 Barrie et al.

(Continued)

FOREIGN PATENT DOCUMENTS

CA 2334546 8/2001
DE 19515983 11/1996

(Continued)

OTHER PUBLICATIONS

Article for "Easy Riches" by Sigma Game, Strictly Slots, 1 page (Aug. 2001).

(Continued)

*Primary Examiner* — Paul A D'Agostino
*Assistant Examiner* — Carl V Larsen
(74) *Attorney, Agent, or Firm* — Nixon Peabody LLP

(57) ABSTRACT

Gaming devices, gaming systems, methods of conducting a wagering game, and computer programs for initiating a wagering game are presented herein. A gaming device is presented that includes a wager input device, a display, and at least one controller. The controller executes the wagering game, which includes first and second progressive awards each associated with a respective symbol-based outcome. Each symbol-based outcome has a respective frequency of occurrence. The controller randomly determines an outcome of the wagering game. The controller initiates a progressive-award-determination sequence in response to displaying the first and/or second symbol-based outcomes. There is a first probability of awarding the first progressive award, and a second probability of awarding the second progressive award. The first initial-award amount is greater than the second initial-award amount, the first frequency of occurrence is lower than the second frequency of occurrence, and the first probability is greater than the second probability.

20 Claims, 16 Drawing Sheets

(56) References Cited

U.S. PATENT DOCUMENTS

| | | | |
|---|---|---|---|
| 4,948,134 | A | 8/1990 | Suttle et al. |
| 5,116,055 | A | 5/1992 | Tracy |
| 5,249,800 | A | 10/1993 | Hilgendorf et al. |
| 5,275,400 | A | 1/1994 | Weingardt et al. |
| 5,280,909 | A | 1/1994 | Tracy |
| 5,344,144 | A | 9/1994 | Canon |
| 5,377,973 | A | 1/1995 | Jones et al. |
| 5,393,057 | A | 2/1995 | Marnell, II |
| 5,397,125 | A | 3/1995 | Adams |
| 5,524,888 | A | 6/1996 | Heidel |
| 5,544,892 | A | 8/1996 | Breeding |
| 5,564,700 | A | 10/1996 | Celona |
| 5,577,959 | A | 11/1996 | Takemoto |
| 5,580,063 | A | 12/1996 | Edwards |
| 5,580,309 | A | 12/1996 | Piechowiak et al. |
| 5,611,730 | A | 3/1997 | Weiss |
| 5,645,486 | A | 7/1997 | Nagao et al. |
| 5,655,961 | A | 8/1997 | Acres et al. |
| 5,707,285 | A | 1/1998 | Place et al. |
| 5,766,076 | A | 6/1998 | Pease et al. |
| RE35,864 | E | 7/1998 | Weingardt |
| 5,779,549 | A | 7/1998 | Walker et al. |
| 5,816,918 | A | 10/1998 | Kelly et al. |
| 5,820,459 | A | 10/1998 | Acres et al. |
| 5,823,874 | A | 10/1998 | Adams |
| 5,839,956 | A | 11/1998 | Takemoto |
| 5,848,932 | A | 12/1998 | Adams |
| 5,855,515 | A | 1/1999 | Pease et al. |
| 5,876,284 | A | 3/1999 | Acres et al. |
| 5,885,158 | A | 3/1999 | Torango et al. |
| 5,919,088 | A | 7/1999 | Weiss |
| 5,941,773 | A | 8/1999 | Harlick |
| 5,947,820 | A | 9/1999 | Morro et al. |
| 5,997,401 | A | 12/1999 | Crawford |
| 6,003,013 | A | 12/1999 | Boushy et al. |
| 6,007,427 | A | 12/1999 | Wiener et al. |
| 6,012,982 | A | 1/2000 | Piechowiak et al. |
| 6,047,963 | A | 4/2000 | Pierce et al. |
| 6,089,977 | A | 7/2000 | Bennett |
| 6,089,980 | A | 7/2000 | Gauselmann |
| 6,102,474 | A | 8/2000 | Daley |
| 6,102,799 | A | 8/2000 | Stupak |
| 6,110,043 | A | 8/2000 | Olsen |
| 6,139,013 | A | 10/2000 | Pierce et al. |
| 6,142,872 | A | 11/2000 | Walker et al. |
| 6,146,273 | A | 11/2000 | Olsen |
| 6,155,925 | A | 12/2000 | Giobbi et al. |
| 6,158,741 | A | 12/2000 | Koelling |
| 6,159,097 | A | 12/2000 | Gura |
| 6,168,523 | B1 | 1/2001 | Piechowiak et al. |
| 6,203,010 | B1 | 3/2001 | Jorasch et al. |
| 6,206,374 | B1 | 3/2001 | Jones |
| 6,206,782 | B1 | 3/2001 | Walker et al. |
| 6,210,275 | B1 | 4/2001 | Olsen |
| 6,210,277 | B1 | 4/2001 | Stefan |
| 6,217,448 | B1 * | 4/2001 | Olsen .............................. 463/25 |
| 6,220,593 | B1 | 4/2001 | Pierce et al. |
| 6,224,482 | B1 | 5/2001 | Bennett |
| 6,224,484 | B1 | 5/2001 | Okuda et al. |
| 6,231,445 | B1 | 5/2001 | Acres |
| 6,254,483 | B1 | 7/2001 | Acres |
| 6,280,328 | B1 | 8/2001 | Holch et al. |
| 6,312,332 | B1 | 11/2001 | Walker et al. |
| 6,315,660 | B1 | 11/2001 | DeMar et al. |
| 6,319,125 | B1 | 11/2001 | Acres |
| 6,319,127 | B1 | 11/2001 | Walker et al. |
| 6,328,649 | B1 | 12/2001 | Randall et al. |
| 6,336,859 | B2 | 1/2002 | Jones et al. |
| 6,336,862 | B1 | 1/2002 | Byrne |
| 6,345,824 | B1 | 2/2002 | Selitzky |
| 6,358,149 | B1 | 3/2002 | Schneider et al. |
| 6,361,441 | B1 | 3/2002 | Walker et al. |
| 6,364,768 | B1 | 4/2002 | Acres et al. |
| 6,375,567 | B1 | 4/2002 | Acres |
| 6,375,568 | B1 | 4/2002 | Roffman et al. |
| 6,416,409 | B1 | 7/2002 | Jordan |
| 6,431,983 | B2 | 8/2002 | Acres |
| 6,435,968 | B1 | 8/2002 | Torango |
| 6,439,995 | B1 | 8/2002 | Hughs-Baird et al. |
| 6,482,089 | B2 | 11/2002 | DeMar et al. |
| 6,506,117 | B2 | 1/2003 | DeMar et al. |
| 6,508,707 | B2 | 1/2003 | DeMar et al. |
| 6,511,375 | B1 | 1/2003 | Kaminkow |
| 6,517,433 | B2 | 2/2003 | Loose et al. |
| 6,520,855 | B2 | 2/2003 | DeMar et al. |
| 6,577,733 | B1 | 6/2003 | Charrin |
| 6,585,591 | B1 | 7/2003 | Baerlocher et al. |
| 6,589,115 | B2 | 7/2003 | Walker et al. |
| 6,592,460 | B2 | 7/2003 | Torango |
| 6,595,854 | B2 | 7/2003 | Hughs-Baird et al. |
| 6,599,185 | B1 | 7/2003 | Kaminkow et al. |
| 6,599,186 | B1 | 7/2003 | Walker et al. |
| 6,599,188 | B2 | 7/2003 | Hirsch et al. |
| 6,599,193 | B2 | 7/2003 | Baerlocher et al. |
| 6,601,771 | B2 | 8/2003 | Charrin |
| 6,612,927 | B1 | 9/2003 | Slomiany et al. |
| 6,638,164 | B2 | 10/2003 | Randall et al. |
| 6,648,762 | B2 | 11/2003 | Walker et al. |
| 6,688,977 | B1 | 2/2004 | Baerlocher et al. |
| 6,712,695 | B2 | 3/2004 | Mothwurf et al. |
| 6,722,982 | B2 | 4/2004 | Kaminkow et al. |
| 6,733,390 | B2 | 5/2004 | Walker et al. |
| 6,796,899 | B2 | 9/2004 | Baerlocher |
| 6,802,775 | B2 | 10/2004 | Baerlocher et al. |
| 6,863,607 | B2 | 3/2005 | Gerrard |
| 6,875,108 | B1 | 4/2005 | Hughs-Baird |
| 6,913,533 | B2 | 7/2005 | Cuddy et al. |
| 6,932,701 | B2 | 8/2005 | Glavich et al. |
| 6,966,833 | B2 | 11/2005 | Kaminkow et al. |
| 6,971,954 | B2 | 12/2005 | Randall et al. |
| 6,986,710 | B2 | 1/2006 | Baerlocher et al. |
| 7,036,012 | B2 | 4/2006 | Charrin |
| 7,056,206 | B2 | 6/2006 | Aoki et al. |
| 7,104,886 | B2 | 9/2006 | Baerlocher et al. |
| 7,160,186 | B2 | 1/2007 | Cuddy et al. |
| 7,160,188 | B2 | 1/2007 | Kaminkow et al. |
| 7,182,689 | B2 | 2/2007 | Hughs-Baird et al. |
| 7,192,349 | B2 | 3/2007 | Baerlocher et al. |
| 7,235,011 | B2 | 6/2007 | Randall et al. |
| 7,273,415 | B2 | 9/2007 | Cregan et al. |
| 7,303,469 | B2 | 12/2007 | Kaminkow |
| 7,318,773 | B2 | 1/2008 | Baerlocher |
| 7,338,367 | B2 | 3/2008 | Kaminkow et al. |
| 7,341,512 | B2 | 3/2008 | Dolloff et al. |
| 7,357,712 | B2 | 4/2008 | Mead et al. |
| 7,510,473 | B2 | 3/2009 | Thomas |
| 7,662,040 | B2 | 2/2010 | Englman et al. |
| 7,850,524 | B2 | 12/2010 | Jackson |
| 7,874,915 | B2 | 1/2011 | Caspers et al. |
| 2002/0065124 | A1 | 5/2002 | Ainsworth |
| 2002/0138594 | A1 | 9/2002 | Rowe |
| 2002/0151345 | A1 | 10/2002 | Byrne |
| 2002/0155874 | A1 | 10/2002 | Byrne |
| 2003/0014370 | A1 | 1/2003 | Charrin |
| 2003/0027618 | A1 | 2/2003 | Byrne |
| 2003/0036430 | A1 | 2/2003 | Cannon |
| 2003/0045337 | A1 | 3/2003 | Byrne |
| 2003/0045354 | A1 | 3/2003 | Giobbi |
| 2003/0050106 | A1 | 3/2003 | Lyfoung |
| 2003/0054875 | A1 | 3/2003 | Marks et al. |
| 2003/0060266 | A1 | 3/2003 | Baerlocher |
| 2003/0064776 | A1 | 4/2003 | Byrne |
| 2003/0109306 | A1 | 6/2003 | Karmarkar |
| 2003/0148808 | A1 | 8/2003 | Price |
| 2003/0181231 | A1 | 9/2003 | Vancura et al. |
| 2003/0186733 | A1 | 10/2003 | Wolf et al. |
| 2003/0216166 | A1 | 11/2003 | Baerlocher et al. |
| 2003/0222402 | A1 | 12/2003 | Olive |
| 2003/0228899 | A1 | 12/2003 | Evans |
| 2003/0236116 | A1 | 12/2003 | Marks et al. |
| 2004/0009808 | A1 | 1/2004 | Gauselmann |
| 2004/0009811 | A1 | 1/2004 | Torango |
| 2004/0038741 | A1 | 2/2004 | Gauselmann |
| 2004/0048644 | A1 | 3/2004 | Gerrard et al. |

(56) References Cited

U.S. PATENT DOCUMENTS

| | | | | |
|---|---|---|---|---|
| 2004/0048646 | A1 | 3/2004 | Visocnik | |
| 2004/0106448 | A1 | 6/2004 | Gauselmann | |
| 2004/0185932 | A1 | 9/2004 | Lombardo | |
| 2005/0148383 | A1 | 7/2005 | Mayeroff | |
| 2006/0111169 | A1 | 5/2006 | Hornik et al. | |
| 2006/0116187 | A1* | 6/2006 | Johnson et al. | 463/16 |
| 2006/0166731 | A1* | 7/2006 | Yoshimi et al. | 463/20 |
| 2007/0015572 | A1* | 1/2007 | Baerlocher | 463/25 |
| 2007/0026941 | A1* | 2/2007 | Block et al. | 463/29 |
| 2007/0060314 | A1* | 3/2007 | Baerlocher et al. | 463/25 |
| 2007/0060319 | A1* | 3/2007 | Block et al. | 463/27 |
| 2007/0191088 | A1 | 8/2007 | Breckner et al. | |
| 2008/0039191 | A1 | 2/2008 | Cuddy | |
| 2009/0017906 | A1* | 1/2009 | Jackson | 463/26 |
| 2009/0042643 | A1 | 2/2009 | Gagner et al. | |
| 2009/0104986 | A1 | 4/2009 | Englman et al. | |
| 2009/0124345 | A1* | 5/2009 | Gilmore et al. | 463/20 |
| 2009/0247277 | A1 | 10/2009 | Caspers et al. | |
| 2009/0247292 | A1 | 10/2009 | Caspers et al. | |
| 2009/0270168 | A1 | 10/2009 | Englman et al. | |
| 2010/0016060 | A1 | 1/2010 | Jaffe | |
| 2010/0048284 | A1 | 2/2010 | Jaffe | |
| 2010/0069135 | A1* | 3/2010 | Davis et al. | 463/16 |
| 2010/0087246 | A1 | 4/2010 | Ward | |
| 2010/0087256 | A1 | 4/2010 | Frattinger et al. | |
| 2010/0093422 | A1 | 4/2010 | Gomez | |
| 2010/0113131 | A1 | 5/2010 | Aoki et al. | |
| 2010/0124989 | A1 | 5/2010 | Englman et al. | |
| 2010/0291998 | A1 | 11/2010 | Anderson et al. | |
| 2011/0098107 | A1 | 4/2011 | Gomez et al. | |

FOREIGN PATENT DOCUMENTS

| | | |
|---|---|---|
| DE | 19624321 | 1/1998 |
| EP | 0521599 | 1/1993 |
| GB | 2153572 | 8/1985 |
| GB | 2181589 | 4/1987 |
| GB | 2242300 | 9/1991 |
| GB | 2313792 | 10/1997 |
| GB | 2333880 | 8/1999 |
| WO | 99/03078 | 1/1999 |
| WO | 99/19037 | 4/1999 |
| WO | 01/33478 | 5/2001 |
| WO | 03/026754 | 4/2003 |
| WO | 03/083789 | 10/2003 |
| WO | 2007/089410 | 8/2007 |
| WO | 2007/146693 | 12/2007 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

* cited by examiner

PROGRESSIVE WAGERING GAME HAVING SYMBOL-TRIGGERING AWARD FEATURE

CROSS-REFERENCE AND CLAIM OF PRIORITY TO RELATED APPLICATIONS

This application is a continuation of U.S. patent application Ser. No. 13/156,005, which was filed on Jun. 8, 2011, now allowed, and claims the benefit of and priority to U.S. Provisional Patent Application No. 61/366,259, filed Jul. 21, 2010, and U.S. Provisional Patent Application No. 61/405,935, filed Oct. 22, 2010, all of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to gaming devices, gaming systems, and methods for playing wagering games. More particularly, the present disclosure relates to wagering games with multiple progressive awards and gaming devices and systems for playing a wagering game with multiple progressive awards.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators strive to employ the most entertaining and exciting machines, features, and enhancements available because such machines attract frequent play and hence increase profitability to the operator.

One concept that has been successfully employed to enhance the entertainment value of a game is that of a “secondary” or “bonus” game which may be played in conjunction with a “basic” game. The bonus game, which is entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed to enhance player entertainment and achieve player loyalty is the use of progressive games. In the gaming industry, a “progressive” game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a “progressive winning position” is achieved at a participating gaming device. If the gaming device is a slot machine, a progressive winning position may, for example, correspond to alignment of progressive jackpot reel symbols along a certain payline. Typically, the initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. Typically, once the progressive jackpot is awarded, the jackpot amount is reset to the predetermined minimum amount.

In existing progressive games, there may be a single progressive jackpot or multiple progressive jackpots that may be awarded. Each progressive jackpot is typically awarded upon the occurrence of a single, qualifying jackpot-won event (e.g., a predetermined symbol combination on an active payline of the base game). In addition, the probability of achieving the qualifying jackpot-won event and, thus, winning a particular progressive jackpot is typically fixed prior to initiation of the wagering game, and remains fixed throughout game play. While some progressive game features provide some enhanced excitement, there is a continuing need to develop new features for progressive games to satisfy the demands of players and operators. Such new features for progressive games will further enhance player excitement, perpetuate player loyalty, and thus increase game play.

SUMMARY

According to one aspect of the present disclosure, a gaming device for playing a wagering game is featured. The gaming device includes an input device for receiving wagers from players to play the wagering game, and a display for displaying outcomes of the wagering game. The gaming device also includes at least one controller operatively configured to execute the wagering game, the wagering game including a first supplemental award and a second supplemental award. The first supplemental award is associated with a first symbol-based outcome. The first supplemental award has a first initial-award amount, while the first symbol-based outcome has a first frequency of occurrence. The second supplemental award is associated with a second symbol-based outcome distinct from the first symbol-based outcome. The second supplemental award has a second initial-award amount, and the second symbol-based outcome has a second frequency of occurrence. The at least one controller is also configured to: determine an outcome of the wagering game, the outcome being determined from a plurality of outcomes, the plurality of outcomes including the first and second symbol-based outcomes; initiate a first supplemental-award-determination sequence in response to displaying the first symbol-based outcome, the first supplemental-award-determination sequence having a first probability of awarding the first supplemental award; and initiate a second supplemental-award-determination sequence in response to displaying the second symbol-based outcome, the second supplemental-award-determination sequence having a second probability of awarding the second supplemental award. The first initial-award amount is greater than the second initial-award amount, the first frequency of occurrence is lower than the second frequency of occurrence, and the first probability is greater than the second probability.

According to another aspect of the disclosure, a gaming system is presented. The gaming system includes means for receiving a wager from a player to play a wagering game, means for receiving play input from the player, means for displaying the wagering game, and means for executing the wagering game. The wagering game includes first and second progressive awards. The first progressive award is associated with one or more first symbol-based outcomes. The first progressive award has a first initial-award amount, and the first symbol-based outcomes have a first frequency of occurrence. The second progressive award is associated with one or more second symbol-based outcomes distinct from the one or more first symbol-based outcomes. The second progressive award has a second initial-award amount, and the second symbol-based outcomes have a second frequency of occurrence. The gaming system also includes means for determining an outcome of the wagering game, where the outcome is randomly determined from a plurality of wagering game outcomes, the plurality of wagering game outcomes including the first and second symbol-based outcomes. The gaming system further comprises means for initiating: a first progressive-award-determination sequence in response to displaying at least one of the one or more first symbol-based outcomes, the first progressive-award-determination sequence having a first probability of awarding the first progressive award; and a second progressive-award-determination sequence in response to displaying at least one of the one or more second symbol-based outcomes, the second progressive-award-determination sequence having a second probability of awarding the second progressive award. The first initial-award amount is greater than the second initial-award amount, the first frequency of occurrence is lower than the second frequency of occurrence, and the first probability is greater than the second probability.

According to yet another aspect of the present disclosure, a method of conducting a wagering game is presented. The method comprises: initiating the wagering game using at least one processor, the wagering game including a plurality of awards each associated with a respective symbol-based outcome, each of the plurality of awards having a respective initial-award amount, each of the respective symbol-based outcomes having a respective frequency of occurrence; randomly determining, via at least one processor, an outcome of the wagering game; causing at least one display device to display the wagering game outcome; determining, via at least one processor, if the wagering game outcome corresponds to one of a plurality of predefined wagering game outcomes having a predefined award associated therewith; awarding a respective first award if the wagering game outcome corresponds to one of the plurality of predefined wagering game outcomes having a predefined award associated therewith; initiating an award-determination sequence responsive to the wagering game outcome comprising a predefined wagering game outcome to determine whether or not to award a second award, the award-determination sequence comprising a predefined probability of a positive outcome and a complementary probability of a negative outcome; and in response to the occurrence of the negative outcome in the award-determination sequence, increasing the predefined probability of the positive outcome for successive wagering game play.

According to even yet another aspect of the present disclosure, a method of conducting a wagering game is featured. The method includes initiating the wagering game using at least one processor. The wagering game includes a first progressive award associated with a first symbol-based outcome, and a second progressive award associated with a second symbol-based outcome that is distinct from the first symbol-based outcome. The first progressive award has a first value and the second progressive award has a second value. The method also includes randomly determining, via at least one processor, an outcome of the wagering game. The outcome is determined from a plurality of wagering game outcomes, which include the first and second symbol-based outcomes. The method also includes causing at least one display device to display the wagering game outcome, and initiating a progressive-award-determination sequence in response to displaying at least one of the first and second symbol-based outcomes to determine whether or not to award the progressive award associated with the displayed at least one of the first and second symbol-based outcomes. If the progressive-award-determination sequence decides to award the progressive award associated with the displayed at least one symbol-based outcome, the method includes awarding the progressive award associated with the displayed at least one symbol-based outcome. If the progressive-award-determination sequence decides not to award the progressive award associated with the displayed at least one symbol-based outcome, the method includes increasing a respective probability of awarding the progressive award associated with the displayed at least one symbol-based outcome by a predetermined amount.

According to even yet another aspect of the present disclosure, one or more computer readable storage media are encoded with instructions for directing a gaming system to perform any or all of the above methods.

The above summary is not intended to represent each embodiment or every aspect of the present invention. Rather, the summary merely provides an exemplification of some of the novel features presented herein. The above features and advantages, and other features and advantages of the present disclosure, will be readily apparent from the following detailed description of the embodiments and best modes for carrying out the present invention when taken in connection with the accompanying drawings and the appended claims.

Figure 1A:
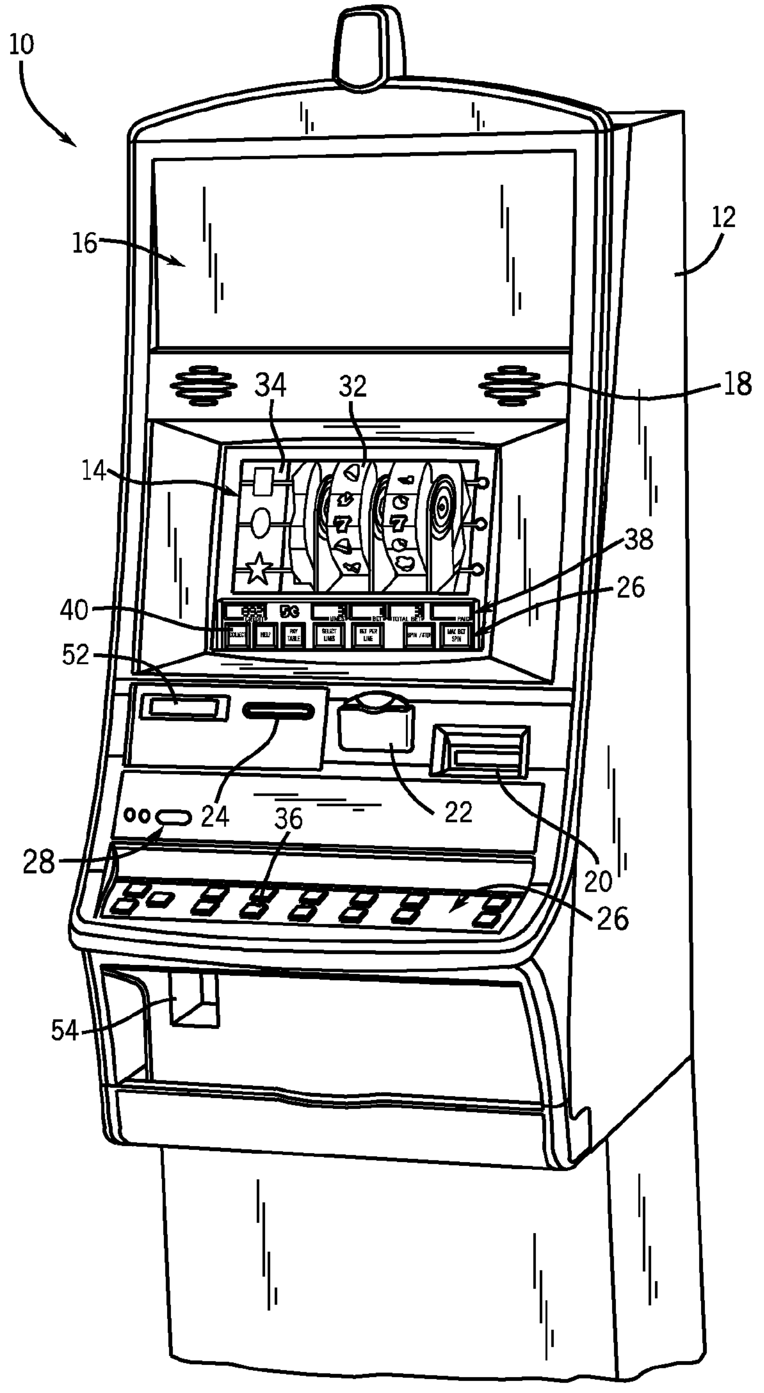
FIG. 1A is a perspective-view illustration of an exemplary free-standing gaming terminal according to aspects of the present disclosure.

While the invention is susceptible to various modifications and alternative forms, specific embodiments have been shown by way of example in the drawings and will be described in detail herein. It should be understood, however, that the present invention is not intended to be limited to the particular forms disclosed. Rather, the invention is to cover all modifications, equivalents, and alternatives falling within the spirit and scope of the invention as defined by the appended claims.

DETAILED DESCRIPTION OF THE EXEMPLARY EMBODIMENTS

While this invention is susceptible of embodiment in many different forms, there are shown in the drawings and will herein be described in detail representative embodiments with the understanding that the present disclosure is to be considered as an exemplification of the various aspects and principles of the disclosure, and is not intended to limit the broad aspect of the invention to the embodiments illustrated. To that extent, elements and limitations that are disclosed, for example, in the Abstract, Summary, and Detailed Description of the Exemplary Embodiments sections, but not explicitly set forth in the claims, should not be incorporated into the claims, singly or collectively, by implication, inference or otherwise.

Referring to the drawings, and initially to FIG. 1A, a perspective-view illustration of an exemplary gaming terminal 10 (also referred to herein as "wagering game machine" or "gaming machine") is shown in accordance with one embodiment of the present disclosure. The gaming terminal 10 of FIG. 1 may be used, for example, in traditional gaming establishments, such as casinos, and non-traditional gaming establishments, such as pools, hotels, restaurants, and airports. With regard to the present disclosure, the gaming terminal 10 may be any type of gaming terminal and may have varying structures and methods of operation. For example, in some aspects, the gaming terminal 10 can be a mechanical or electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, a mobile telecommunications device, such as a mobile telephone or personal digital assistant (PDA), a counter-top or bar-top gaming terminal, or other personal electronic devices, such as a portable television, MP3 player, entertainment device, etc. Finally, the drawings presented herein are not to scale and are provided purely for explanatory purposes; as such, the individual and relative dimensions shown in the drawings are not to be considered limiting.

The gaming terminal 10 illustrated in FIG. 1A comprises a cabinet or housing 12. For output devices, this embodiment of the gaming terminal 10 includes, for example, a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1A includes, for example, a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 includes, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433, to Timothy C. Loose et al., entitled "Reel Spinning Slot Machine with Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1A. The primary display area 14 includes, in relation to many aspects of wagering games conducted on the gaming terminal 10, one or more paylines 30 (see FIG. 3) extending along a portion of the primary display area.

In the illustrated embodiment of FIG. 1A, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1A is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

As shown in FIG. 1A, the player-input or user-input device(s) 26 include, by way of example and in any combination, a plurality of buttons 36 on a button panel, a mouse, a joy stick, a switch, a microphone, and a touch screen 38 mounted over the primary display area 14 and/or the secondary display area 16 and having one or more soft touch keys 40. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, to John J. Giobbi, which is entitled "Portable Data Unit for Communicating with Gaming Machine over Wireless Link," and is incorporated herein by reference in its entirety. The noted account associated with cashless gaming is, in some aspects of the present concepts, stored at an external system 46 (see FIG. 2) as more fully disclosed in U.S. Pat. No. 6,280,328, to Niels C. Holch et al., which is entitled "Cashless Computerized Video Game System and Method," and is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 1B:
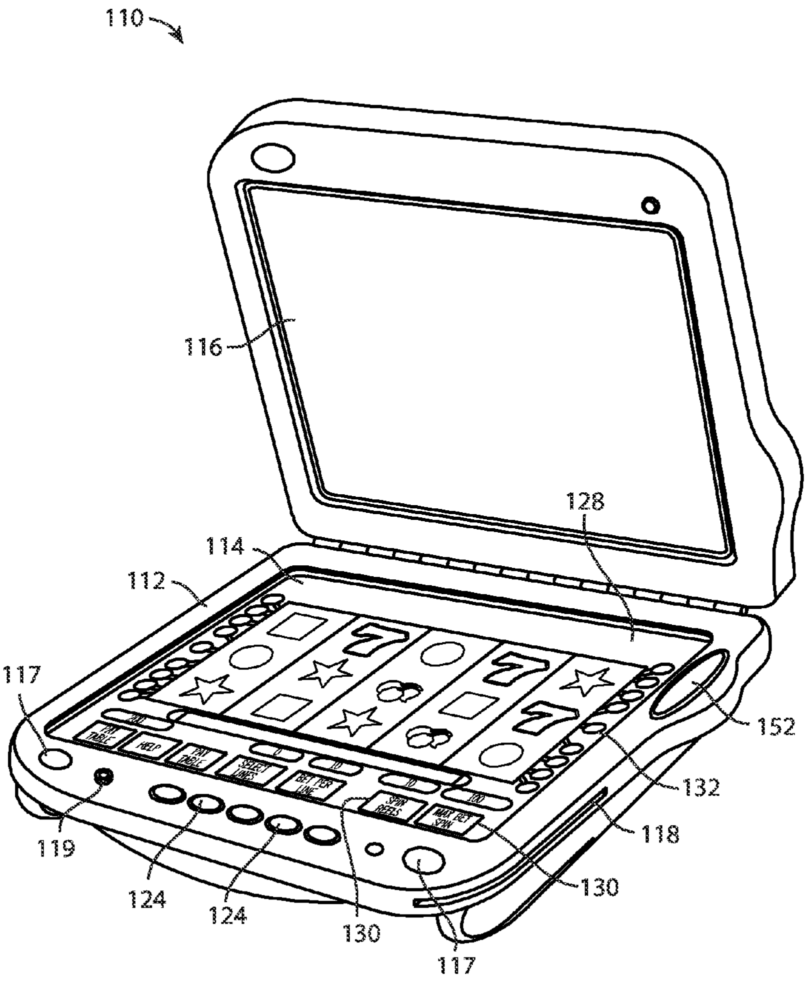
FIG. 1B is a perspective-view illustration of an exemplary handheld gaming device according to aspects of the present disclosure.

Depicted in FIG. 1B is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1B, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

In accordance with some embodiments of the present disclosure, the player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1B, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 can be displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player typically begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variation of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1B, comprises a biometric sensing device.

The handheld device may incorporate the same features as the gaming terminal 10, or variations thereof. A more detailed description of a handheld device that may be utilized with the present disclosure can be found in PCT Patent Application No. PCT/US2007/000792, to Vladimir, I. Arezina et al., which has an international filing date of Jan. 11, 2007 and is entitled "Handheld Device for Wagering Games," and is incorporated herein by reference in its entirety.

Figure 2:
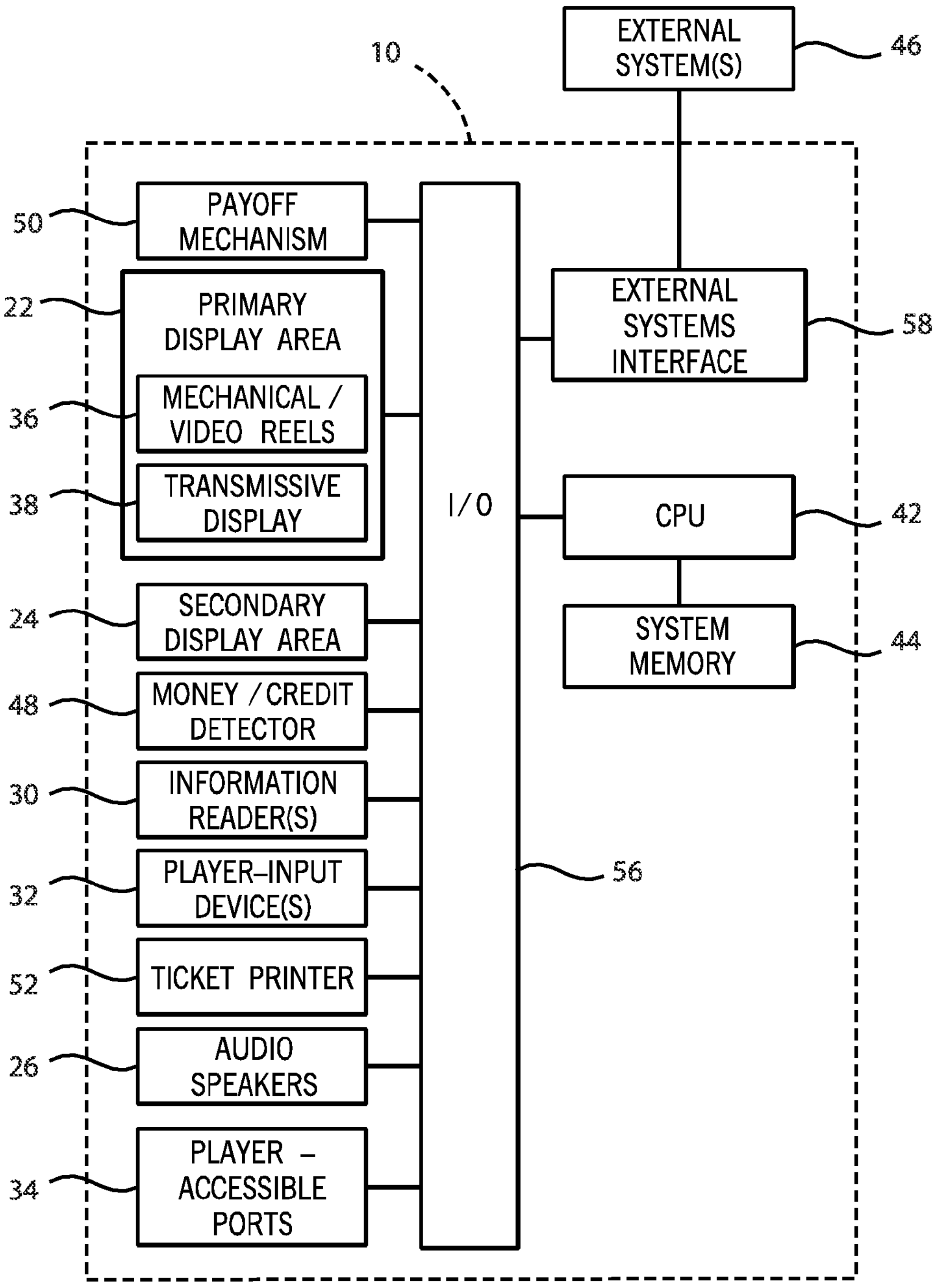
FIG. 2 is a schematic diagram of an exemplary gaming system according to aspects of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
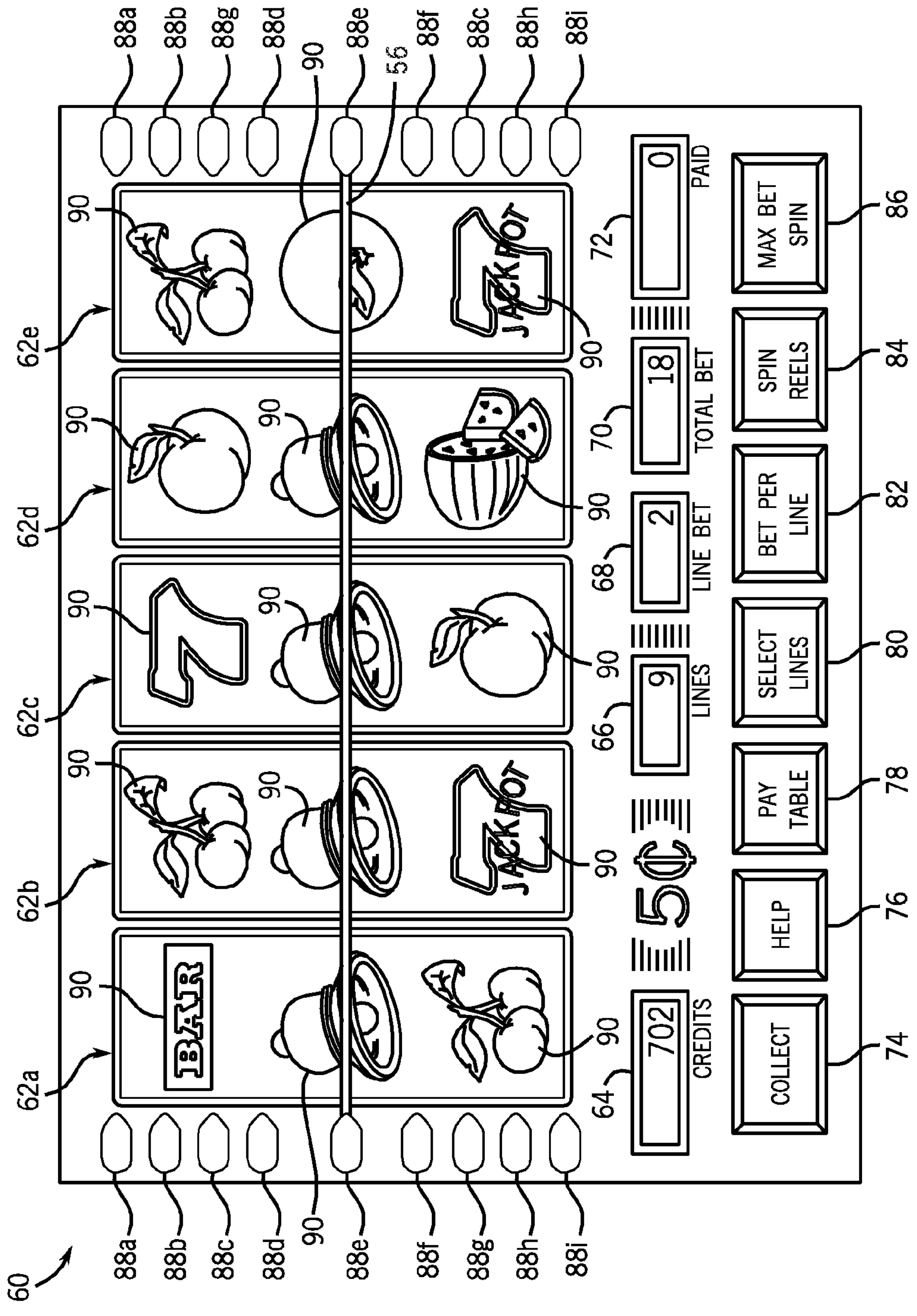
FIG. 3 is a screen shot of a basic-game screen from an exemplary wagering game that can be played, for example, on the gaming terminal of FIG. 1A, the handheld gaming device of FIG. 1B, and the gaming system of FIG. 2.

Referring now to FIG. 3, an image of a basic-game screen 60 adapted to be displayed on the primary display area 14 is illustrated, according to one embodiment of the present disclosure. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming terminal or gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1A, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example).

As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, diagonally, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown in FIG. 3, different embodiments of the gaming terminal 10 comprise a greater or lesser number of reels in accordance with the present disclosure.

Figure 4:
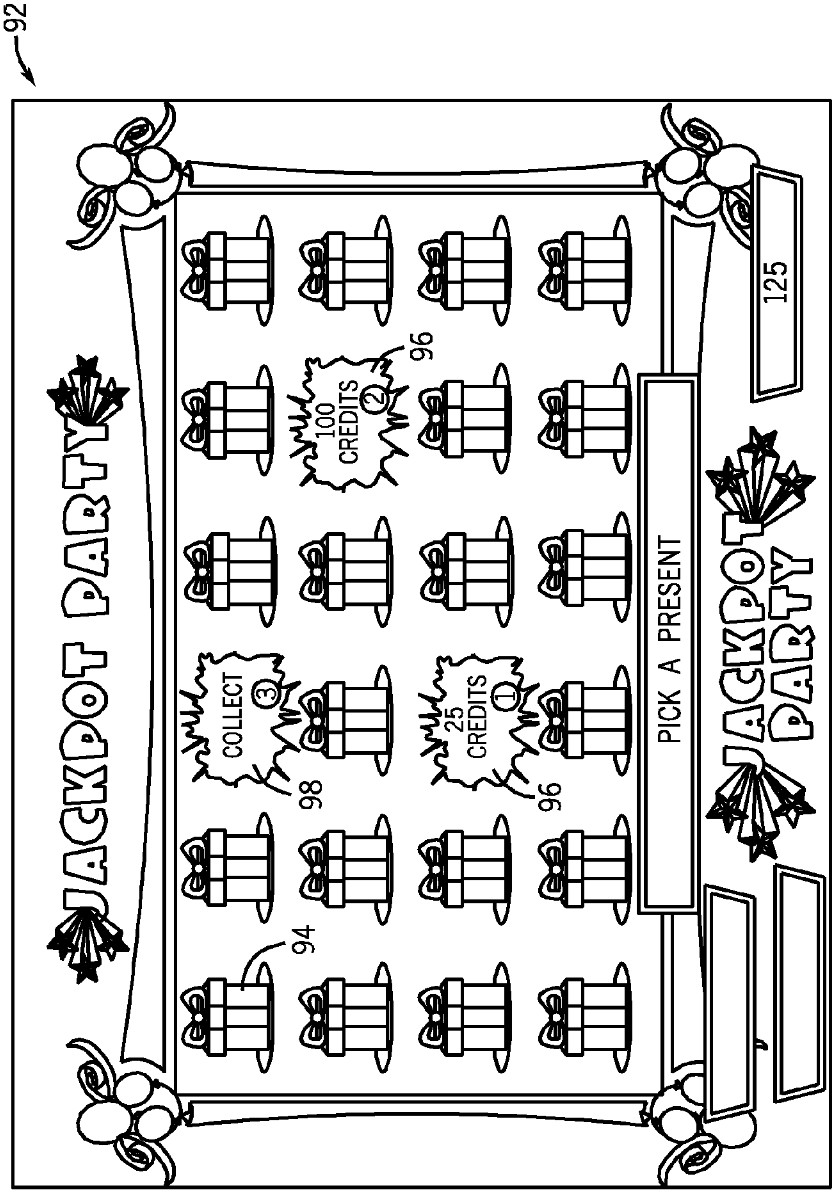
FIG. 4 is a screen shot of a bonus-game screen from an exemplary wagering game that can be played, for example, on the gaming terminal of FIG. 1A, the handheld gaming device of FIG. 1B, and the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
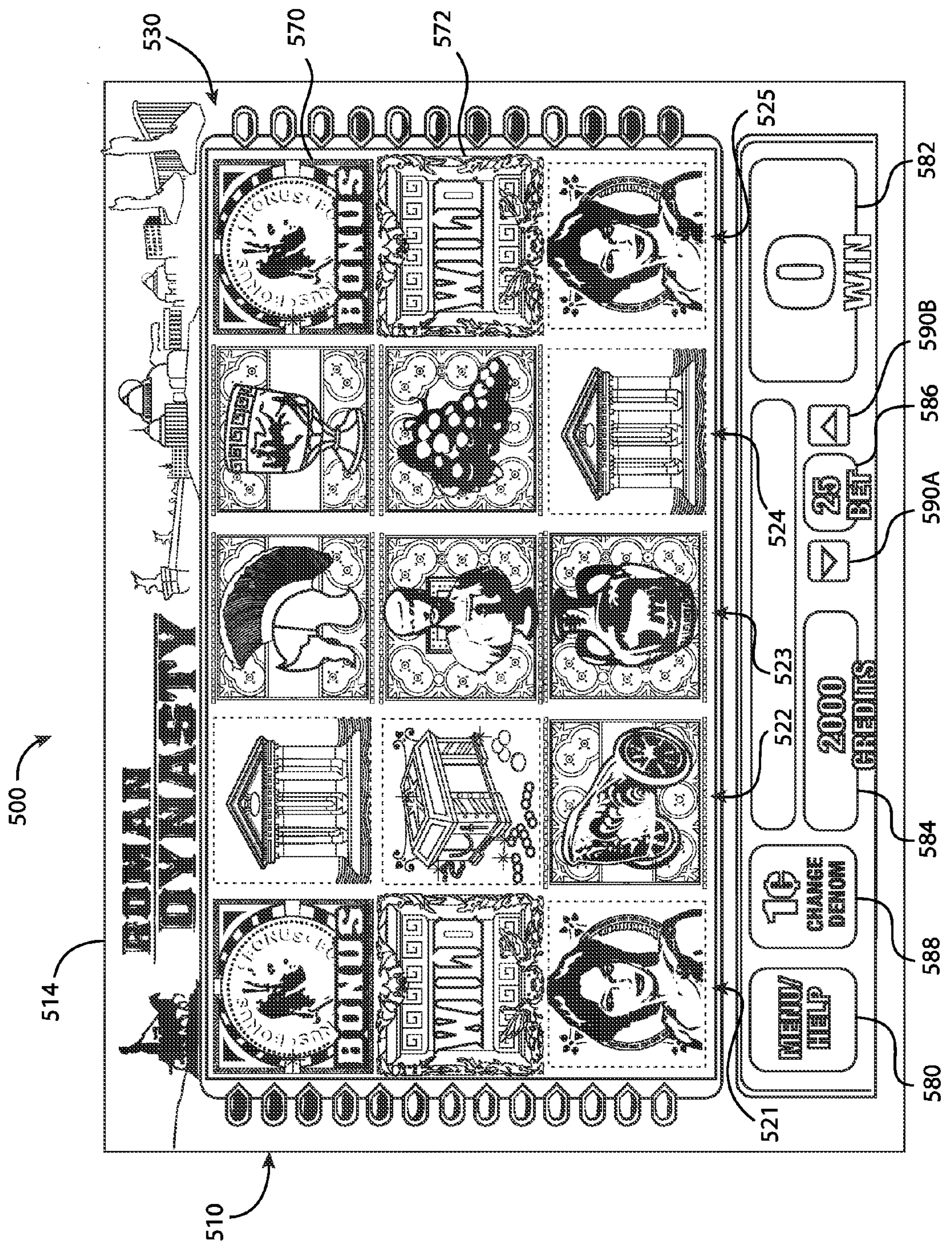
FIG. 5 is a screen shot of a display displaying an exemplary wagering game with a multi-jackpot progressive game in accordance with embodiments of the present disclosure.

Referring now to FIG. 5, a primary display 514 of a gaming device or terminal 510 of a gaming system 500 is shown in accordance with embodiments of the present disclosure. The device or terminal 510 may be a freestanding gaming device (networked or standalone) as seen, for example, in FIG. 1A, a handheld gaming device as seen, for example, in FIG. 1B, or any other device having a display 514. The display 514 may be any form of display, such as those described above with reference to the free standing and handheld devices of FIGS. 1A and 1B, respectively.

The display 514 includes a display of a wagering game 530, which in this example is the slot game shown in FIG. 5. The wagering game 530 includes a plurality of symbol-bearing reels, designated generally as 521-525, respectively, each having a plurality of distinct symbol positions and bearing an array of symbols (collectively represented by first and second symbols 570 and 572 in FIG. 5). The symbols may include any variety of graphical symbols, emblems, elements, or representations, including symbols that are associated with one or more themes (e.g., a "ROMAN DYNASTY" theme) of the gaming terminal 510 or system 500. The symbols may also include a blank symbol or empty space. The reels 521-525 are varied (e.g., spun and stopped) to reveal combinations of symbols, which represent randomly selected outcomes of the wagering game 530, that are evaluated for winning combinations. Winning combinations of symbols landing, for example, on activated paylines (e.g., those paylines for which a wager has been received), cause awards to be paid in accordance with one or more paytables associated with the gaming system 500.

The wagering game 530 can include fewer or additional symbol-bearing reels and/or symbol bearing positions than those shown in FIG. 5, which may be simulated, mechanical, or combinations thereof. Moreover, the randomly selected outcomes of the wagering game 530 may be varied from the representation provided in FIG. 5. By way of non-limiting example, the randomly selected outcomes may comprise greater or fewer than 15 symbols. Optionally, the randomly selected outcomes may comprise a matrix of fixed rows and columns, such as the 3×5 matrix shown in FIG. 5, or may comprise a matrix of variably sized rows and/or columns. Some of the symbols in the wagering game 530 of FIG. 5 may be grouped into a corresponding clump of symbols. The term "clump" or "symbol clump" typically refers to one or more of the same symbols occupying two or more symbol positions that are located immediately adjacent one another on a single reel.

The primary display 514 further includes certain display features for providing information and options to a player. For example, the display features may include a MENU/HELP button 580, a WIN meter 582, a CREDITS meter 584, and a BET meter 586. The MENU/HELP button 580 can be pressed and activated (e.g., through an overlying touch screen) by a player desiring to access other control menus, preferences, help screens, etc. For example, the player can change a theme of the wagering game 530 via the MENU/HELP button 580, or change the type of the wagering game (e.g., to video poker, keno, etc.). The WIN meter 582 displays to the player the amount of the total win (if any) from the most recent play of the wagering game 530. The CREDITS meter 584 displays to the player the total amount of credits (if any) remaining and available to the player for play of the wagering game 530. The BET meter 586 displays to a player the current size of his/her wager (in credits). Fewer, additional or alternative display features may be included for presenting information/options to a player. For example, the primary display 514 may include an optional CHANGE DENOM button 588 that can be activated to change the denomination of wagers which the player is inputting into the system 500, bet change buttons 590A and 590B that permit a player to increase and decrease the size of his/her wager accordingly, a "max bet spin" button (not shown) for wagering a maximum number of credits and spinning the reels of the wagering game 530, as well as any of the credits and meters displayed in FIG. 3.

The exemplary wagering game 530 of FIG. 5 includes a progressive wagering game with a symbol-triggering award feature. In accordance with some aspects of the present concepts, one or more awards, be they progressive jackpots or otherwise, are associated with specific outcomes. The specific outcomes may be symbol-based outcomes, predetermined winning outcomes, or other triggering events that occur during play of the wagering game 530 (e.g., time-based triggers, wager-based triggers, collection-based triggers, etc.). In this example, the awards are not necessarily awarded every time an outcome associated therewith is achieved. Instead, when the outcome is achieved, a random determination is made whether to award the player with the award. If a specific outcome is achieved and a determination is made that a player has won the award, the award is conferred upon the player. Conversely, if a specific outcome is achieved and a determination is made that a player has not won the award, the odds of the player winning that award on the next occurrence of the specific outcome increases for subsequent or successive game play.

Figure 6:
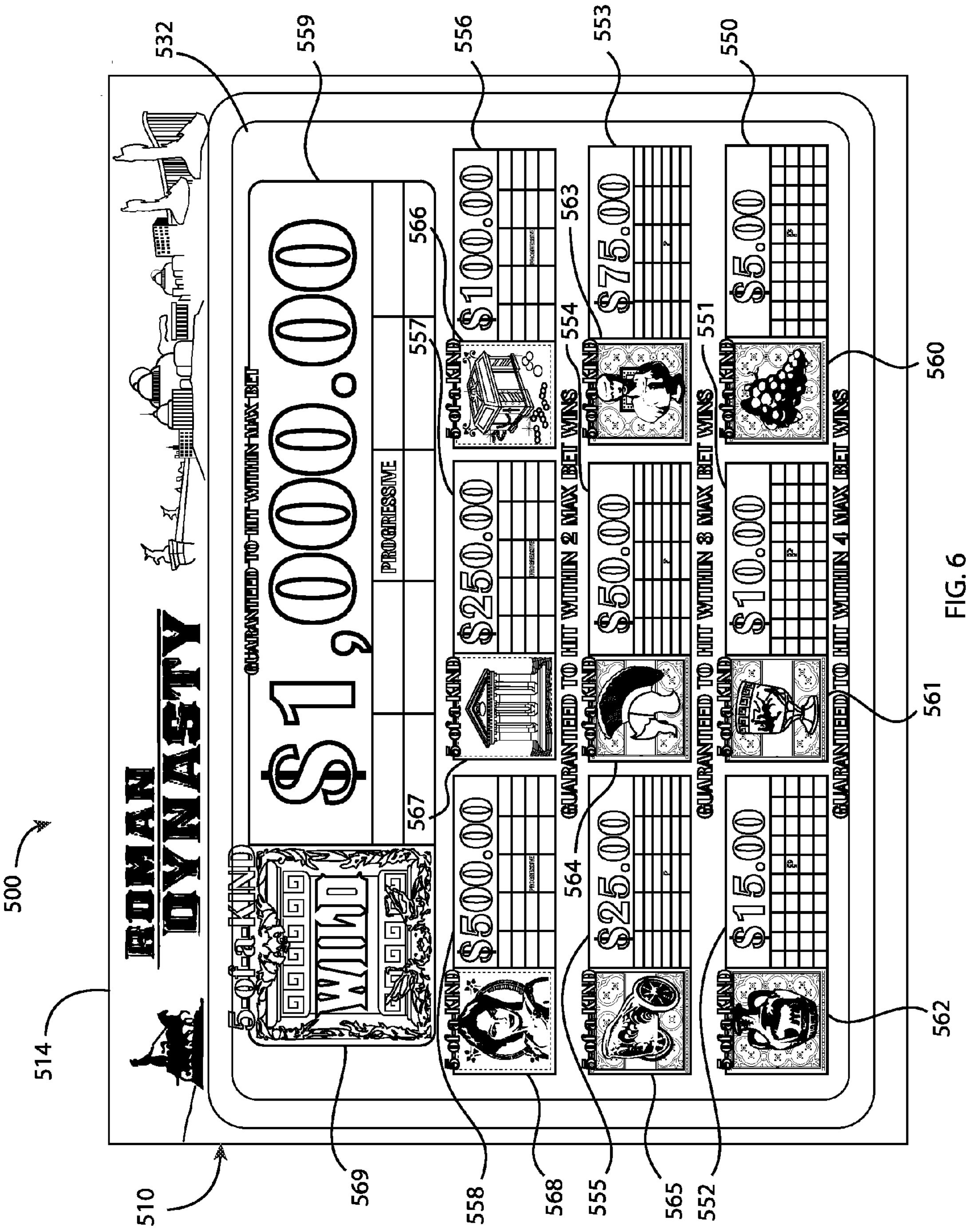
FIG. 6 is a screen shot of a display displaying an exemplary multi-jackpot progressive game that can be associated with the wagering game of FIG. 5.

Turning next to FIG. 6, shown is a screen shot of the display 514 of the gaming device or terminal 510 of FIG. 5 illustrating an exemplary multi-jackpot progressive game 532 that can be associated with the wagering game of FIG. 5 in accordance with embodiments of the present disclosure. The progressive game 532 includes a plurality of awards 550-559, each of which is associated with a respective symbol-based outcome 560-569. By way of non-limiting example, a first progressive award 550 (e.g., $5.00 in FIG. 6) is associated with a first symbol-based outcome 560 (e.g., five grape symbols in FIG. 6). A second progressive award 551 (e.g., $10.00 in FIG. 6) is associated with a second symbol-based outcome 561 (e.g., five goblet symbols in FIG. 6), whereas a third progressive award 552 (e.g., $15.00 in FIG. 6) is associated with a third symbol-based outcome 562 (e.g., five vase symbols in FIG. 6). In addition, a fourth progressive award 553 (e.g., $75.00 in FIG. 6) is associated with a fourth symbol-based outcome 563 (e.g., five statue symbols in FIG. 6), a fifth progressive award 554 (e.g., $50.00 in FIG. 6) is associated with a fifth symbol-based outcome 564 (e.g., five helmet symbols in FIG. 6), and a sixth progressive award 555 (e.g., $25.00 in FIG. 6) is associated with a sixth symbol-based outcome 565 (e.g., five chariot symbols in FIG. 6). A seventh progressive award 556 (e.g., $100.00 in FIG. 6) is associated with a seventh symbol-based outcome 566 (e.g., five chest symbols in FIG. 6), whereas an eighth progressive award 557 (e.g., $250.00 in FIG. 6) is associated with an eighth symbol-based outcome 567 (e.g., five pantheon symbols in FIG. 6). Finally, a ninth progressive award 558 (e.g., $500.00 in FIG. 6) is associated with a ninth symbol-based outcome 568 (e.g., five empress symbols in FIG. 6), and a tenth progressive award 559 (e.g., $1,000.00 in FIG. 6) is associated with a tenth symbol-based outcome 569 (e.g., five wild symbols in FIG. 6). Since each progressive award is associated with a particular symbol-based outcome in the depicted example, players have an equal opportunity to win the same progressive value even though they are wagering different numbers of credits. Thus, at least in some aspects, the probability of achieving eligibility for the progressive-award-determination sequence is wager insensitive.

Greater or fewer than ten awards 550-559 can be offered in the progressive game 532 without departing from the intended scope and spirit of the present disclosure. To that end, the awards 550-559 need not be "progressive" awards, per se, but may be secondary or supplemental awards in alternative embodiments. Likewise, the symbol-based outcomes 560-569 are not restricted to a "five-of-a-kind" symbol combination along an active payline, but may include, for example, greater or fewer than five symbols, which may additionally or optionally be "scattered" symbol combinations. Moreover, one or more of the awards 550-559 may be associated with multiple symbol-based outcomes instead of just a single symbol-based outcome.

Each of the awards 550-559 has an initial-award amount. By way of example, and not limitation, the first progressive award 550 has an initial-award amount of $5.00, the second progressive award 551 has an initial-award amount of $10.00, and the third progressive award 552 has an initial-award amount of $15.00. In addition, the fourth progressive award 553 has an initial-award amount of $75.00, whereas the fifth progressive award 554 has an initial-award amount of $50.00, and the sixth progressive award 555 has an initial-award amount of $25.00. The seventh progressive award 556 has an initial-award amount of $100.00, the eighth progressive award 557 has an initial-award amount of $250.00, the ninth progressive award 558 has an initial-award amount of $500.00, and the tenth progressive award 559 has an initial-award amount of $1,000.00. The various award amounts illustrated in FIG. 6 are purely exemplary in nature, and are in no way limiting. According to some aspects, the value of each progressive can be inversely proportionate to the probability of winning the progressive when the combination is achieved.

Each of the symbol-based outcomes 560-569 has a respective frequency of occurrence during play of the wagering game 530. The frequency of occurrence is generally understood to be the number of times or the regularity with which an outcome of a wagering game will include a particular symbol combination over a statistically significant period of game play (e.g., a full cycle of the wagering game, where the cycle is defined to be the set of all possible outcomes). One or more of the symbol-based outcomes 560-569 may have identical or substantially identical frequencies of occurrence. In one embodiment, the reset value of the progressive, or secondary awards, increase as the likelihood of achieving the winning combination decreases.

Figure 7:
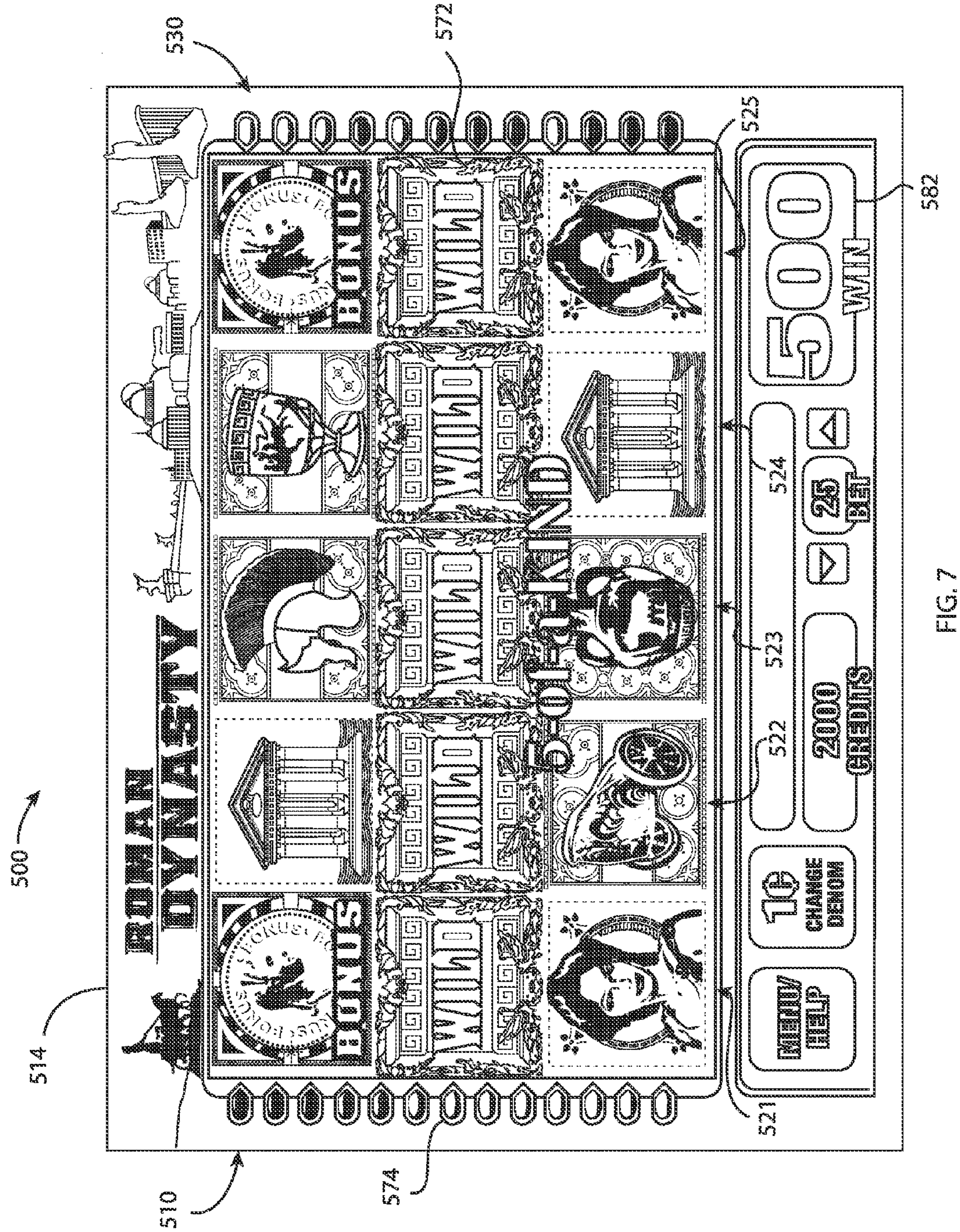
FIG. 7 is a screen shot of a display displaying the exemplary wagering game of FIG. 5, showing a representative triggering event that triggers a chance to enter the exemplary multi-jackpot progressive game of FIG. 6 and win one of the progressive jackpots.

FIG. 7 depicts an outcome of the wagering game 530 where a symbol-driven triggering event initiates a progressive-award-determination sequence. The symbol-driven triggering event in this example includes a particular outcome or arrangement of symbols in the wagering game 530. For example, after the wagering game 530 is initiated, for example, by a player pushing a spin button, the reels 521-525 of FIG. 5 are varied (e.g., spun and stopped) to reveal a combination of symbols, as seen in FIG. 7, which represent a randomly selected outcome of the wagering game 530. In this example, the completed game play results in a winning combination of symbols appearing in the wagering game 530. The wagering game outcome shown in FIG. 7 includes five WILD symbols 572 along an active payline 574. A standard award of five hundred ('500') credits is awarded to the player, in accord with a corresponding pay table, as shown in the WIN meter 582 of FIG. 7, for achieving "5-of-a-KIND" wild symbol combination. The standard award is awarded regardless of whether any progressive award associated with that symbol combination is also awarded in accord with the progressive-award-determination sequence discussed below.

Figure 8:
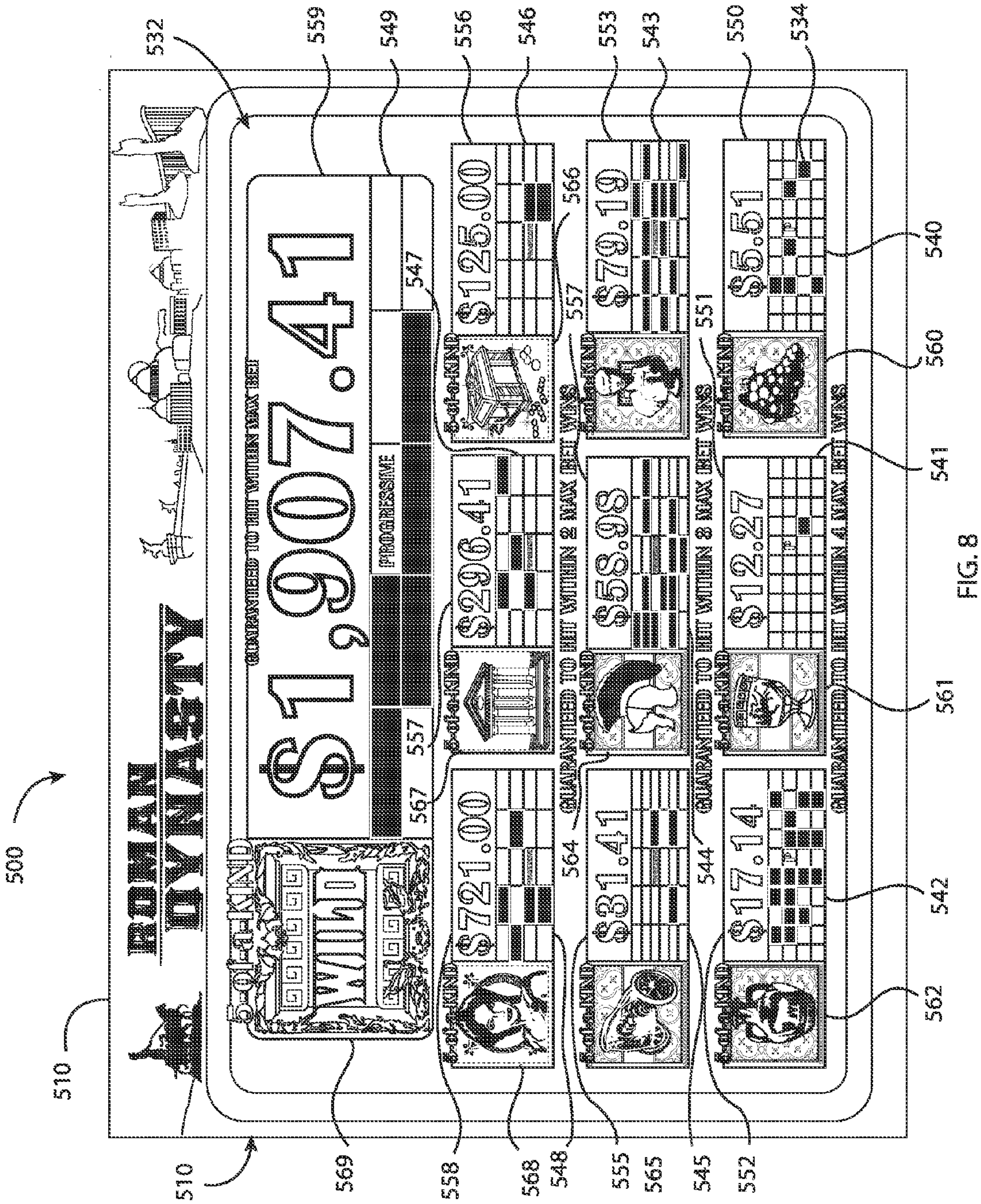
FIG. 8 is a screen shot of a display displaying the exemplary multi-jackpot progressive game of FIG. 6, showing the increasing probability of winning various progressive jackpots with continued game play of the underlying wagering game of FIG. 5.

In response to the occurrence of a triggering event (e.g., the outcome of the wagering game 530 including the "5-of-a-KIND" WILD symbol combination shown in FIG. 7), a progressive-award-determination sequence is initiated to determine whether or not to award the progressive award associated with the achieved symbol combination. In the embodiments shown in FIGS. 6-8, for example, each of the progressive awards 550-559 has a respective probability of being awarded during the progressive-award-determination sequence. This probability component may be visually illustrated to the player as shown in FIG. 8 with grids 540-549, wherein the probability that the progressive award is associated with any one of the selectable grid elements is equal. As described herein, in some aspects, the probability remains uniform for each selection, whereas in other aspects the probability increases with each selection. According to the illustrated embodiment, the gaming system 500 or terminal 510 makes the selections during the progressive-award-determination sequence. In alternative embodiments, the grids 540-549 may be configured as player-selectable elements, whereby the player is prompted to make selections from the grid in an attempt to win the progressive jackpot.

With continuing reference to FIG. 8, the first grid 540, which is a 4×10 matrix of selectable elements (illustrated as boxes), is associated with the first progressive award 550. One of the selectable elements in the grid 540 includes a progressive win marker "P" that, if selected, prompts the award of the first progressive award 550. In some aspects, the progressive win marker is hidden during game play (e.g., if the grids 550-559 are configured as player-selectable elements), whereas in other instances the progressive win maker may be revealed to the player during game play (e.g., when the system 500/terminal 510 makes the selections). Thus, where the probability of selecting an element is equal for all selectable elements, the first grid 540 indicates an initial 1-in-40 chance per selection of awarding the first progressive award 550. By way of example, if an outcome of the wagering game includes five grape symbols along an active payline (i.e., a "5-of-a-KIND" grape symbol combination), thus achieving the first symbol-based outcome 560, a first progressive-award-determination sequence is initiated whereby a random selection of at least one of the selectable elements in the first grid 540 is made. If the random selection includes the selectable element with the progressive win marker "P," the player is awarded the first jackpot 550. If the random selection does not include the progressive win marker "P," the player is not awarded the first jackpot 550 and, in some embodiments, the non-winning selected element is "blacked out" or otherwise rendered inactive, as seen for example via blackout box 534. Thus, at least initially, there is a 1-in-40 chance for every random selection from the first grid 540 that the player can win the first progressive jackpot 550. In some embodiments, explained below, following such unsuccessful selection, there is then a 1-in-39 chance for a subsequent selection.

The second and third grids 541, 542 illustrated in FIG. 8, which are respectively associated with the second and third progressives awards 551, 552, are also 4×10 matrices of selectable elements (illustrated as boxes). Like the first grid 540, at least one of the selectable elements in the second and third grids 541, 542 includes a progressive win marker "P" that, if selected, prompts the award of the respective progressive awards 551, 552. Accordingly, the second and third grids 581, 582 visually indicate an initial 1-in-40 chance per selection of awarding the second and third progressive awards 551, 552. For example, during a second progressive-award-determination sequence, whereby a random selection is made of at least one of the selectable elements in the second grid 541, there is, at least initially, a 1-in-40 chance for each of the random selections from the grid 541 that the player can win the second progressive jackpot 551.

The fourth, fifth and sixth grids 543, 544 and 545, respectively, are correspondingly associated with the fourth, fifth and sixth progressives awards 553, 554, 555. The fourth, fifth and sixth grids 543, 544, 545 are 6×5 matrices of selectable elements (illustrated as boxes), each with one selectable element that includes a progressive win marker "PROGRESSIVE" that, if selected, prompts the award of the respective progressive awards 553, 554, 555. Accordingly, the fourth, fifth and sixth grids 543, 544, 545 visually indicate an initial 1-in-30 chance per selection of awarding the fourth, fifth and sixth progressive awards 553, 554, 555. For example, during a fourth progressive-award-determination sequence, whereby a random selection is made of at least one of the selectable elements in the fourth grid 543, there is, at least initially, a 1-in-30 chance for each of the random selections from the grid 543 that the player will win the fourth progressive jackpot 553.

The seventh, eighth and ninth grids 546, 547 and 548, respectively, are correspondingly associated with the seventh, eighth and ninth progressives awards 556, 557, 558. The seventh, eighth and ninth grids 546, 547, 548 are 4×5 matrices of selectable elements (illustrated as boxes), each with one selectable element that includes a progressive win marker "PROGRESSIVE" that, if selected, prompts the award of the respective progressive awards 556, 557, 558. Accordingly, the seventh, eighth and ninth grids 546, 547, 548 visually indicate an initial 1-in-20 chance per selection of awarding the seventh, eighth and ninth progressive awards 556, 557, 558. For example, during a seventh progressive-award-determination sequence, whereby a random selection is made of at least one of the selectable boxes in the seventh grid 546, there is, at least initially, a 1-in-20 chance for each of the random selections from the grid 546 that the progressive win marker "PROGRESSIVE" will be selected and the player will win the seventh progressive jackpot 556.

With reference now to both FIGS. 7 and 8, the tenth grid 549 is associated with the tenth progressive award 559. The tenth grid 549 is a 2×5 matrix of selectable elements (illustrated as boxes), one of which includes a progressive win marker "PROGRESSIVE" that, if selected, prompts the award of the tenth progressive award 559. Accordingly, the tenth grid 549 indicates an initial 1-in-10 chance per selection of awarding the tenth progressive award 559. By way of example, the outcome of the wagering game 530 shown in FIG. 7 includes five WILD symbols 572 along an active payline 574, thus achieving the tenth symbol-based outcome 569 (i.e., a "5-of-a-KIND" WILD symbol combination). As such, a tenth progressive-award-determination sequence is initiated whereby a random selection is made of at least one of the selectable boxes in the tenth grid 549. If the random selection includes the box with the progressive win marker "PROGRESSIVE," the player is awarded the tenth jackpot 559. If the random selection does not includes the progressive win marker "PROGRESSIVE," the non-winning selected box is blacked out. Thus, there is, at least initially, a 1-in-10 chance for every random selection from the tenth grid 549 that the player can win the tenth progressive jackpot 559.

The number of selectable elements (i.e., the number of possible random outcomes) and the number of winning elements (i.e., the number of progressive-winning outcomes) in each grid 540-549 may be selectively varied, either individually or collectively, depending for example on the volatility and expected value the designer/operator wishes to achieve. For example, decreasing the number of selectable elements, increasing the number of winning elements, or both, will decrease the volatility and increase the expected value of the wagering game 530. In contrast, increasing the number of selectable elements, decreasing the number of winning elements, or both, will decrease the expected value and increase the volatility of the wagering game 530.

In other embodiments, the probability of being awarded a particular award 550-559 during a corresponding progressive-award-determination sequence may be increased or decreased based on the amount of the wager input. For instance, the number of random selections during a particular progressive-award-determination sequence may be dependent upon the size of the player's wager during normal play of the wagering game 530. By way of example, a minimum wager provides for a single selection while a maximum wager provides for two or more selections during a particular progressive-award-determination sequence. Alternatively, the player may be prompted to insert one or more additional wagers for a commensurate number of selections after one of the symbol-based outcomes 560-569 is achieved, but before the progressive-award-determination sequence is commenced. In some embodiments, a player must make an additional side-wager, or "extra bet," to be eligible for the extra payouts or to obtain additional selections when a qualifying outcome has been achieved.

As yet another option, if there are multiple selections made during a single progressive-award-determination sequence, and the corresponding progressive award is awarded before all of the selections are exhausted, the remaining "overflow" selections may then be applied to another one of the progressive awards (e.g., a different grid) or for the reset value for that progressive award (e.g., the same grid), potentially awarding the progressive more than once. For example, if the player's wager level allots for five selections during an initiated progressive-award-determination sequence, and the progressive award is conferred upon the player on the second selection, there are still three unused selections remaining. The progressive award may then be reset (e.g., the player is presented a new, cleared grid). At this point, depending on the game variant, the player is permitted to allocate the "overflow" unused selections to the renewed grid and/or another grid. For example, successful selection of a progressive award may enable the player to make a subsequent selection in the next higher progressive award (e.g., from grid 550 to grid 551). In yet other aspects, the subsequent grid that is available for the player's "overflow" selections may be randomly determined within the entire population of grids or a subset thereof. Continuing with the above example, if the player is permitted to apply the "overflow" selections to the renewed grid (e.g., grid 546), the player's odds of achieving the selectable element associated with the progressive award would be 1-in-20 for the first pick, 1-in-19 for the second pick (if the first pick is unsuccessful), 1-in-18 for the third pick (if the first and second picks are both unsuccessful), etc.

According to another option, the player may be guaranteed to win a particular award within a reduced number of selections during a progressive-award-determination sequence if the player places a maximum wager or a side bet. For example, there is initially a 1-in-40 chance of winning the first, second, or third progressive awards 550, 551, 552, as noted hereinabove with respect to FIG. 6. The player may be compelled to place a maximum bet, however defined, during play of the wagering game 530 if the progressive game 532 guarantees that the player will win the progressive awards 550, 551, 552 within, for example, four max-bet wins that include the corresponding symbol-based outcomes 560, 561, 562. For example, the player can be guaranteed a 1-in-4 chance of winning the first progressive award 550 so long as each time the first symbol-based outcome 560 is achieved, a max bet was placed for play of that game. As another example, the tenth symbol-based outcome 569 includes a combination of top-award symbols—e.g., five WILD symbols 572 along an active payline 574. In the exemplary embodiment illustrated in FIGS. 6 and 8, the probability of winning the tenth progressive award 559 can be guaranteed (is set equal to 100%) if a predetermined maximum bet is placed during play of the underling wagering game.

In some embodiments, such as the embodiment represented in FIG. 8, the selectable elements are persistent such that once a non-winning element (e.g., one without a progressive win marker associated therewith) has been selected and blacked out it cannot be reselected until, for example, after a winning element (e.g., one with a progressive win marker associated therewith) has been selected and the corresponding award conferred upon the player. By way of clarification, when a first progressive-award-determination sequence is initiated, as discussed above, and a non-winning element is selected, the first progressive award 550 is not awarded to the player and that selected non-winning element is blacked out (e.g., blackout box 534) and cannot subsequently be reselected, for example, until the grid 540 or element 534 is reset (e.g., after the first progressive award 550 is awarded.) If the first symbol-based outcome 560 is achieved during subsequent and/or successive play of the wagering game 530, the probability of awarding the first progressive award 550 increases because there is one less non-winning element that can be selected during a subsequent progressive-award-determination sequence. In the illustrated example of FIG. 8, where there are now six (6) blacked-out boxes in the first grid 540, there is now a 1-in-34 chance during the next random selection of the progressive-award-determination sequence of selecting the progressive win marker "P" and, thus, awarding the first progressive award 550. Thus, the probability of winning the progressive award 550 increases over time for each occurrence of the first symbol-based outcome 560.

In some embodiments, the odds of winning a particular progressive award on a particular outcome varies with respect to the winning combinations. For example, if a player hits a "5-of-a-KIND" top award, such as the tenth symbol-based outcome 569 of five WILD symbols 572 in FIG. 6, the player is shown initially having a 1-in-10 chance of winning the tenth progressive award 559. Alternatively, if the player hits a "5-of-a-KIND" low award, such as the first symbol-based outcome 560 of five grape symbols in FIG. 6, the player is shown initially having a 1-in-40 chance of winning the first progressive award 550. In this example, however, the overall odds of winning the first progressive award 550 is higher because a player may be 10-times more likely to achieve the first symbol-based outcome 560 than the tenth symbol-based outcome 569. Continuing with this example, the "5-of-a-KIND" top award may have a frequency of 1-in-500, whereas the "5-of-a-KIND" low award may have a frequency of 1-in-50. Therefore, as can be seen from this example, the "5-of-a-KIND" top award has an overall probability of occurrence of 1-in-5000, whereas the "5-of-a-KIND" low award has an overall probability of occurrence of 1-in-2000. Thus, as can be seen from the foregoing, the high-value frequency multiplied by the high-value probability is less than the low-value frequency multiplied by the low-value probability.

In some embodiments, the progressive award values (e.g., the jackpot award value, the reset value, or other fund pool or hidden value, singly or in combination) increment only when a progressive-award-determination sequence is initiated, for example, in response to achieving one of the "5-of-a-KIND" symbol-based outcomes 560-569 of FIGS. 6 and 8, but the corresponding progressive award is not awarded. In traditional progressive games, coin-in data is collected from participating gaming machines, and a fixed percentage of that coin-in data is automatically contributed to one or more progressive jackpot(s) regardless of the wagering game outcome. In the noted embodiment, however, a progressive award is increased only when a progressive-award-determination sequence is initiated and the corresponding progressive award is not awarded. For example, if an outcome of the wagering game includes five grape symbols along an active payline (i.e., a "5-of-a-KIND" grape symbol combination), thus achieving the first symbol-based outcome 560, a first progressive-award-determination sequence is initiated whereby a random selection of at least one of the selectable elements in the first grid 540 is made. If the random selection includes the element with the progressive win marker "P," the player is awarded the first jackpot 550 and, in some configurations, the progressive award resets and the grid is renewed. If the random selection does not include the progressive win marker "P," the player is not awarded the first jackpot 550 and, in some embodiments, the first progressive award 550 is increased. The incremented progressive awards may be increased by a fixed amount, a variable amount, a fixed percentage, a variable percentage, or any combination thereof, depending, for example, on the wagering game volatility, the wager size, the progressive level, and/or the expected value. For example, a responsive increase of the first progressive award 550 may be by a first predetermined amount, and a responsive increase of the second progressive award 551 may be by a second predetermined amount that is different from the first predetermined amount. Moreover, incrementing the progressive level may include funding a respective reset value (e.g., the value at which the progressive jackpot is reset to after being awarded to a player) or simply adding funds to a progressive level (whether it be to the current jackpot, the reset value, or some other hidden value). Of course, the progressives may be funded or incremented in accord with any conventional technique.

Optionally, all of the progressive levels (e.g., progressive awards 550-559) may be increased in response to a progressive-award-determination sequence being initiated and not awarding a corresponding award. Additionally or alternatively, in some embodiments, all of the progressive levels (e.g., progressive awards 550-559) may be increased responsive to a wagering game outcome that does not include any of the symbol-based outcomes 560-569. Alternatively, the progressives may increment by a predetermined percentage on every wager or in any other manner known to those of ordinary skill in the art.

Turning next to FIGS. 9-13, a primary display 614 of a gaming device or terminal 610 of a gaming system 600 is shown. The device or terminal 610 may be a freestanding gaming device (networked or standalone) as seen, for example, in FIG. 1A, a handheld gaming device as seen, for example, in FIG. 1B, or any other device having a display 614. The display 614 may be any form of display, such as those described with reference to the free standing and handheld devices of FIGS. 1A and 1B, respectively. In this embodiment, the wagering game is presented as a video poker game 630, which is exemplified as standard "Five Card Draw" poker. It should be recognized, however, that the wagering game presented in FIGS. 9-13 may comprise other forms of poker, such as "Texas Hold'em", "Omaha Hi", "Seven Card Stud", etc., as well as other card games, such as black jack, gin, mah-jongg, baccarat, and known variations thereof, without departing from the scope and spirit of the present disclosure.

The poker game is preferably played with a single, standard 52-card deck (i.e., Ace through King of four different suits). One or more cards (e.g., sevens, "one-eyed jacks", "suicide kings", etc.) may be designated as "wild". One or more "Joker" cards may be added to the standard deck, each of which may be designated with a predetermined characteristic (e.g., wild). Further, the poker game may be played with additional predefined "special" card(s) (e.g., a "Go Fish!" card) for triggering a special feature (e.g., a "Go Fish!" feature). Such a special feature is disclosed in U.S. Pat. No. 7,056,206 B2, to Dion K. Aoki et al., which issued on Jun. 6, 2006, and is entitled "Method of Conducting a Video Poker Game," which is incorporated herein by reference in its entirety.

During a particular game play or "hand," all dealt and drawn cards preferably come from the same deck (but may, alternatively, come from multiple decks). As such, after a card is dealt or drawn from the deck into the poker hand, that card is "used up" and cannot appear again until at least the next poker hand. The deck may thereafter be replenished and randomly shuffled prior to every poker hand or, alternatively, after cycling through the entire deck or stack of decks. The system memory 44 preferably includes a data structure for storing data representing each card of the deck. The CPU 42 selects cards for each poker hand from the data structure, and controls at least one of the displays 14, 16 to display the cards.

Figure 9:
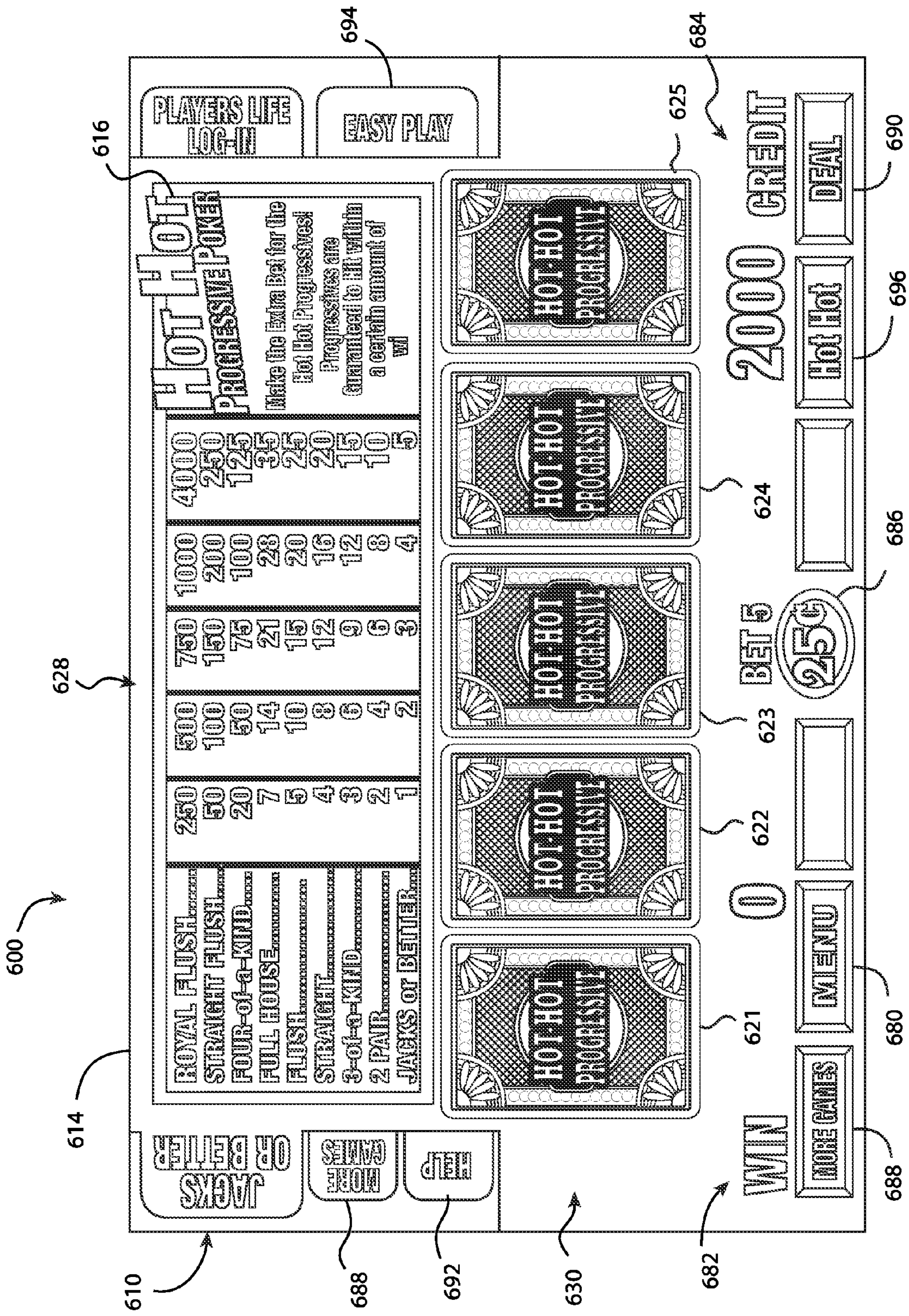
FIG. 9 is a screen shot of a display displaying an exemplary wagering game with a multi-jackpot progressive game in accordance with embodiments of the present disclosure.

FIG. 9 is a screen shot of a display 614 displaying a wagering game 630, presenting the poker game of this embodiment prior to a first outcome—e.g., before a new hand is dealt. The image includes five playing cards 621-625, certain game-session meters, various buttons selectable by a player, and a pay table, designated generally as 628 in FIG. 9. In the illustrated embodiment, the game-session meters include, for example: a MENU button 680 that can be activated by a player desiring to access other control menus, preferences, help screens, etc.; a WIN meter 682 for displaying a total number of credits awarded (if any) as a result of the most recent play of the wagering game 630; a CREDITS meter 684 for displaying a total number of credits (if any) remaining and available for play; and a BET meter 686 for displaying to a player the current size of his/her wager. Other fields and meters may be incorporated into the display 614, such as a MORE GAMES button 688, which allows the player to change the theme and/or type of wagering game being played. Fewer, additional or alternative display features may be included for presenting information/options to a player.

The player-selectable buttons include a DEAL button 690 for causing the game to provide a first outcome—e.g., deal an initial array of cards from a deck into a hand. The DEAL button 690 is also for causing the game to selectively modify the first outcome—e.g., draw cards from a deck to replace any cards in the hand not "held" by a player. A BET ONE button (not shown) may be included whereby the player increases the amount of the wager displayed in the BET meter 686 one credit for each press of the button. A HELP tab 692 may be activated, for example, to view instructions on how to play the wagering game. An EASY PLAY tab 694 may also be provided such that when a wining hand is dealt, a player may hold all the winning cards in the dealt hand, prior to the draw, with a single press of the EASY PLAY tab 694. A MAX BET button (not shown) may be added so the player can wager a maximum number of credits, such as twenty-five ('25') credits, without having to repeatedly press the BET ONE button. The player-selectable buttons may comprise additional buttons, fewer buttons, and different buttons from those shown. For example, the player-selectable buttons may include a "speed" button for changing the speed at which cards are dealt from the deck (e.g., slow, medium, or fast).

A pay table 628 is preferably positioned above the playing cards 621-625. The pay table 628 displays a general list of successful outcomes (e.g., winning poker hand rankings) and the corresponding number of credits awarded for each outcome. The winning poker hand rankings are presented top-to-bottom, in order from highest to lowest, as: a Royal Flush, a Straight Flush, Four of a Kind, a Full House, a Flush, a Straight, Three of a Kind, Two Pair, and a Pair of Jacks or Better. In the illustrated embodiment, any poker hand (i.e., outcome of the wagering game 630) having a ranking less than a Pair of Jacks or Better does not have an award associated therewith. In the illustration provided, the number of credits won is linearly proportional to the number of credits wagered, except that a "royal flush" yields a bonus when achieved on a maximum wager.

Figure 11:
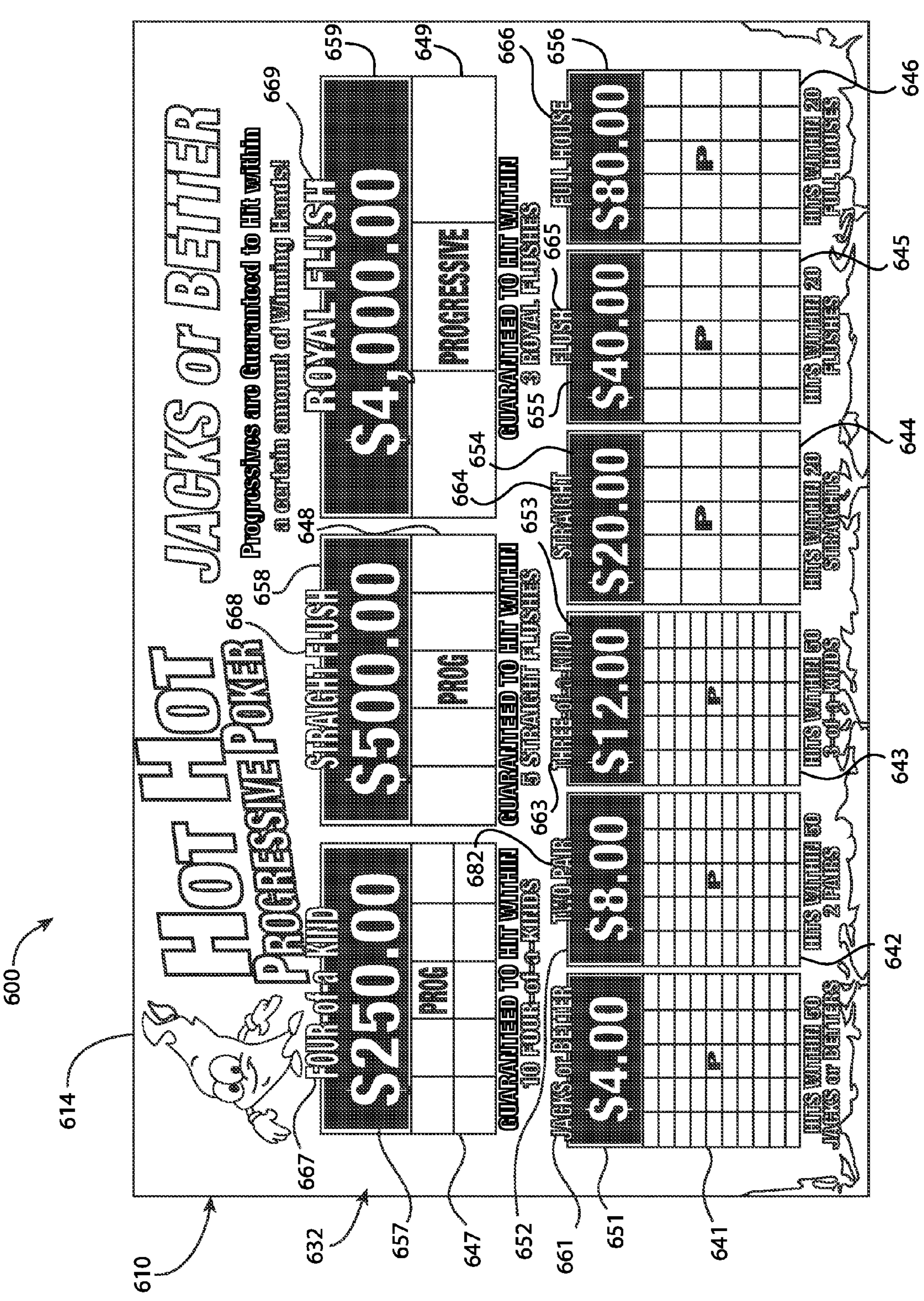
FIG. 11 is a screen shot of a display displaying an exemplary multi-jackpot progressive game that can be associated with the wagering game of FIG. 9.
Figure 12:
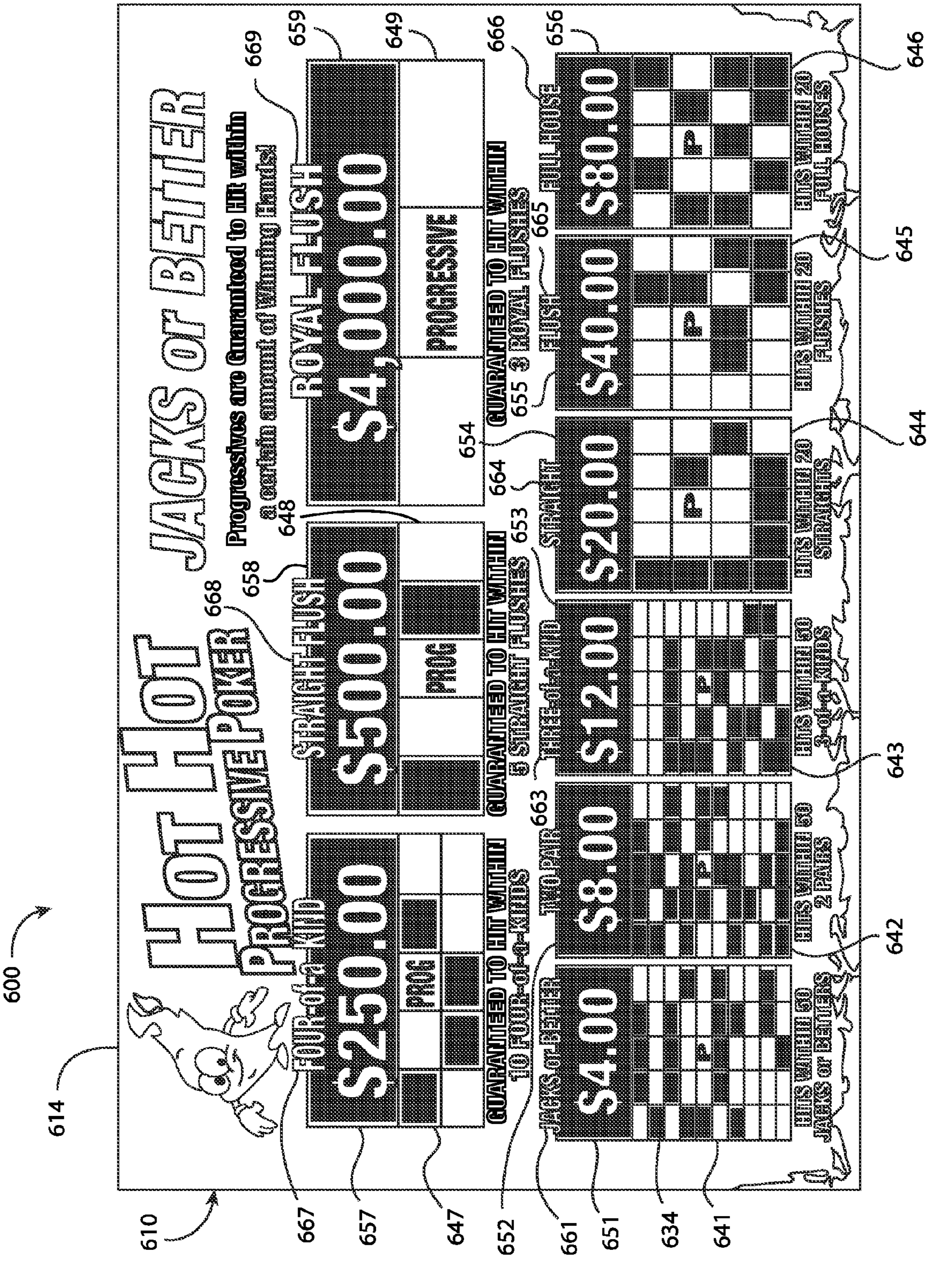
FIG. 12 is a screen shot of a display displaying the exemplary multi-jackpot progressive game of FIG. 11, showing the increasing probability of winning various progressive jackpots with continued game play of the underlying wagering game of FIG. 9.

The exemplary wagering game 630 of FIG. 9 includes a "HOT HOT Progressive Game," indicated generally at 632 in FIG. 11. The HOT HOT Progressive Game 632 may be similar to the multi-jackpot progressive game 532 of FIGS. 5-8 and, thus, may include any combination of the features described above with respect to FIGS. 5-8. In this particular embodiment, the player may be required to input an additional or supplemental wager to activate the HOT HOT Progressive Game 632, as indicated in the information box 616 in FIG. 9. Once the additional wager is placed, the player may then be required to press a HOT HOT button 696 to activate the HOT HOT Progressive Game 632 or, alternatively, it may be automatically enabled.

Figure 10:
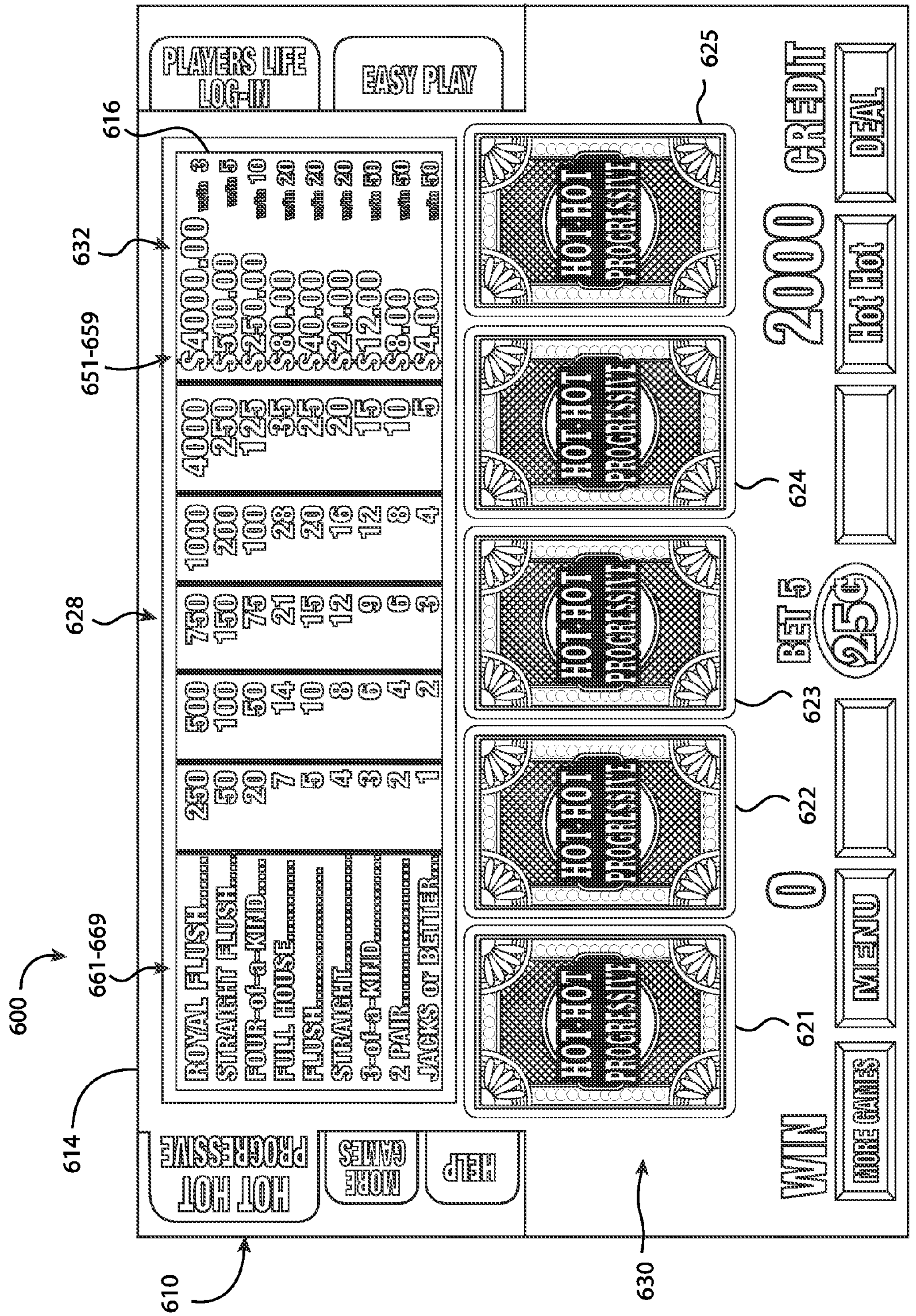
FIG. 10 is a screen shot of a display displaying the exemplary wagering game of FIG. 9 after player activation of a multi-jackpot progressive game in accordance with embodiments of the present disclosure.

FIG. 10 provides a screen shot of the display 614 after the HOT HOT Progressive Game 632 has been activated, as indicated by the information box 616, which provides a representative configuration of a multi-jackpot progressive game that can be associated with the wagering game 630. With reference to both FIGS. 10 and 11, the progressive game 632 includes a plurality of awards 651-659 (FIG. 11), each of which is associated with a respective symbol-based outcome 661-669. By way of non-limiting example, a first progressive award 651 (e.g., $4.00 in FIG. 11) is associated with a first symbol-based outcome 661 (e.g., a pair of JACKS or BETTER in FIG. 11). A second progressive award 652 (e.g., $8.00 in FIG. 11) is associated with a second symbol-based outcome 662 (e.g., TWO PAIR in FIG. 11), whereas a third progressive award 653 (e.g., $12.00 in FIG. 11) is associated with a third symbol-based outcome 663 (e.g., THREE of a KIND in FIG. 11). In addition, a fourth progressive award 654 (e.g., $20.00 in FIG. 11) is associated with a fourth symbol-based outcome 664 (e.g., a STRAIGHT in FIG. 11), a fifth progressive award 655 (e.g., $40.00 in FIG. 11) is associated with a fifth symbol-based outcome 665 (e.g., a FLUSH in FIG. 11), and a sixth progressive award 656 (e.g., $80.00 in FIG. 11) is associated with a sixth symbol-based outcome 666 (e.g., a FULL HOUSE in FIG. 11). A seventh progressive award 657 (e.g., $250.00 in FIG. 11) is associated with a seventh symbol-based outcome 667 (e.g., FOUR of a KIND in FIG. 11), whereas an eighth progressive award 658 (e.g., $500.00 in FIG. 11) is associated with an eighth symbol-based outcome 668 (e.g., a STRAIGHT FLUSH in FIG. 11), and a ninth progressive award 659 (e.g., $4,000.00 in FIG. 11) is associated with a ninth symbol-based outcome 669 (e.g., a ROYAL FLUSH in FIG. 11).

Greater or fewer than nine awards 651-659 can be offered in the progressive game 632 without departing from the intended scope and spirit of the present disclosure. To that end, the awards 651-659 need not be "progressive" awards, per se, but may be secondary or supplemental awards. Likewise, the symbol-based outcomes 661-669 are not restricted to the particular card combinations set forth in FIGS. 10 and 11. Moreover, one or more of the awards 651-659 may be associated with multiple symbol-based outcomes instead of just a single symbol-based outcome. In addition, one or more of the awards 651-659 may be associated with the same symbol-based outcome without departing from the intended scope and spirit of the present disclosure.

Each of the awards 651-659 has an initial-award amount. By way of example, and not limitation, the first progressive award 651 has an initial-award amount of $4.00, the second progressive award 652 has an initial-award amount of $8.00, and the third progressive award 653 has an initial-award amount of $12.00. In addition, the fourth progressive award 654 has an initial-award amount of $20.00, whereas the fifth progressive award 655 has an initial-award amount of $40.00, and the sixth progressive award 656 has an initial-award amount of $80.00. The seventh progressive award 657 has an initial-award amount of $250.00, the eighth progressive award 658 has an initial-award amount of $500.00, and the ninth progressive award 659 has an initial-award amount of $4,000.00. The various award amounts illustrated in FIG. 11 are purely exemplary in nature, and are in no way limiting. Each of the symbol-based outcomes 661-669 has a respective frequency of occurrence during play of the wagering game 630. The frequency of occurrence for each symbol-based outcome may be varied, individually or collectively, from those disclosed above.

In response to the occurrence of a triggering event (e.g., the outcome of the wagering game 630 including one of the card combinations 661-669 shown in FIG. 7), a progressive-award-determination sequence is initiated to determine whether or not to award the progressive award associated with that card combination. In the embodiment shown, each of the progressive awards 651-659 has a respective probability of being awarded during the progressive-award-determination sequence. In accord with at least some aspects of the present concepts, each selectable element has an equal probability of being associated with a progressive award. This probability component may be visually illustrated to the player, for example, via grids 641-649 of FIG. 11. The first grid 641, which is a 5×10 matrix of selectable elements (illustrated as boxes), is associated with the first progressive award 651. One of the selectable elements in the grid 641 includes a progressive win marker "P" that, if selected, prompts the award of the first progressive award 651. Accordingly, the first grid 641 indicates, at least initially, a 1-in-50 chance per selection of awarding the first progressive award 651. By way of example, if an outcome of the wagering game 630 includes two "Kings," thus achieving the first symbol-based outcome 661 of JACKS or BETTER, a first progressive-award-determination sequence is initiated whereby a random selection of at least one of the selectable elements in the first grid 641 is made. If the random selection includes the element with the progressive win marker "P," the player is awarded the first jackpot 651. If the random selection does not include the progressive win marker "P," the player is not awarded the first jackpot 651 and, in some embodiments, the non-winning selected element is "blacked out" or otherwise rendered inactive, as seen, for example, via blackout box 634 in FIG. 12. Thus, there is, at least initially, a 1-in-50 chance for every random selection from the first grid 641 that the player can win the first progressive jackpot 651. Synonymous with the first grid 641, the second and third grids 642, 643 visually indicate an initial 1-in-50 chance per selection of awarding the second and third progressive award 652, 653, respectively.

The fourth, fifth and sixth grids 644, 645 and 646, respectively, are correspondingly associated with the fourth, fifth and sixth progressives awards 654, 655, 656. The fourth, fifth and sixth grids 644, 645, 646 are 4×5 matrices of selectable elements (illustrated as boxes), each with one selectable element that includes a progressive win marker "P" that, if selected, prompts the award of the corresponding progressive awards 654, 655, 656. Accordingly, the fourth, fifth and sixth grids 644, 645, 646 visually indicate an initial 1-in-20 chance per selection of awarding the fourth, fifth and sixth progressive awards 654, 655, 656. The seventh, eighth and ninth grids 647, 648 and 649, respectively, are correspondingly associated with the seventh, eighth and ninth progressives awards 657, 658, 659. The seventh grid 647 is a 2×5 matrix of selectable elements (illustrated as boxes), with one selectable element that includes a progressive win marker "PROG" that, if selected, prompts the award of the seventh progressive award 657. Accordingly, the seventh grid 647 visually indicates an initial 1-in-10 chance per selection of awarding the seventh progressive award 657 during a corresponding progressive-award-determination sequence. The eighth grid 648 is a 1×5 matrix of selectable elements (illustrated as boxes), with one selectable element that includes a progressive win marker "PROG" that, if selected, prompts the award of the eighth progressive award 658. Accordingly, the eighth grid 648 visually indicates an initial 1-in-5 chance per selection of awarding the eighth progressive award 658. Finally, the ninth grid 649 is a 1×3 matrix of selectable elements (illustrated as boxes), with one selectable box that includes a progressive win marker "PROGRESSIVE" that, if selected, prompts the award of the ninth progressive award 659. Accordingly, the ninth grid 649 visually indicates an initial 1-in-3 chance per selection of awarding the ninth progressive award 659 during a corresponding progressive-award-determination sequence.

In some embodiments, the selectable elements are persistent such that once a non-winning box (e.g., one without a progressive win marker) has been selected and blacked out it cannot be reselected, for example, until after a winning box (e.g., one with a progressive win marker) has been selected and the corresponding award conferred upon the player. By way of non-limiting clarification, when a first progressive-award-determination sequence is initiated, as discussed above, and a non-winning element is selected, the first progressive award 651 is not awarded to the player and that selected non-winning element is "blacked out" (e.g., blackout box 634 in FIG. 12) and cannot subsequently be reselected until the grid 641 of the box 634 is reset (e.g., after the first progressive award 550 is awarded.) If a first symbol-based outcome 661 is achieved during subsequent and/or successive play of the wagering game 630, the probability of awarding the first progressive award 651 increases because there is one less non-winning box that can be selected during a subsequent progressive-award-determination sequence. In the illustrated example of FIG. 12, where there are now 19 blacked-out boxes in the first grid 641, there is now a 1-in-31 chance during the next random selection of the progressive-award-determination sequence of selecting the progressive win marker "P" and, thus, awarding the first progressive award 651. Thus, the probability of winning the progressive award 651 increases over time for each occurrence of a first symbol-based outcome 661.

Figure 13:
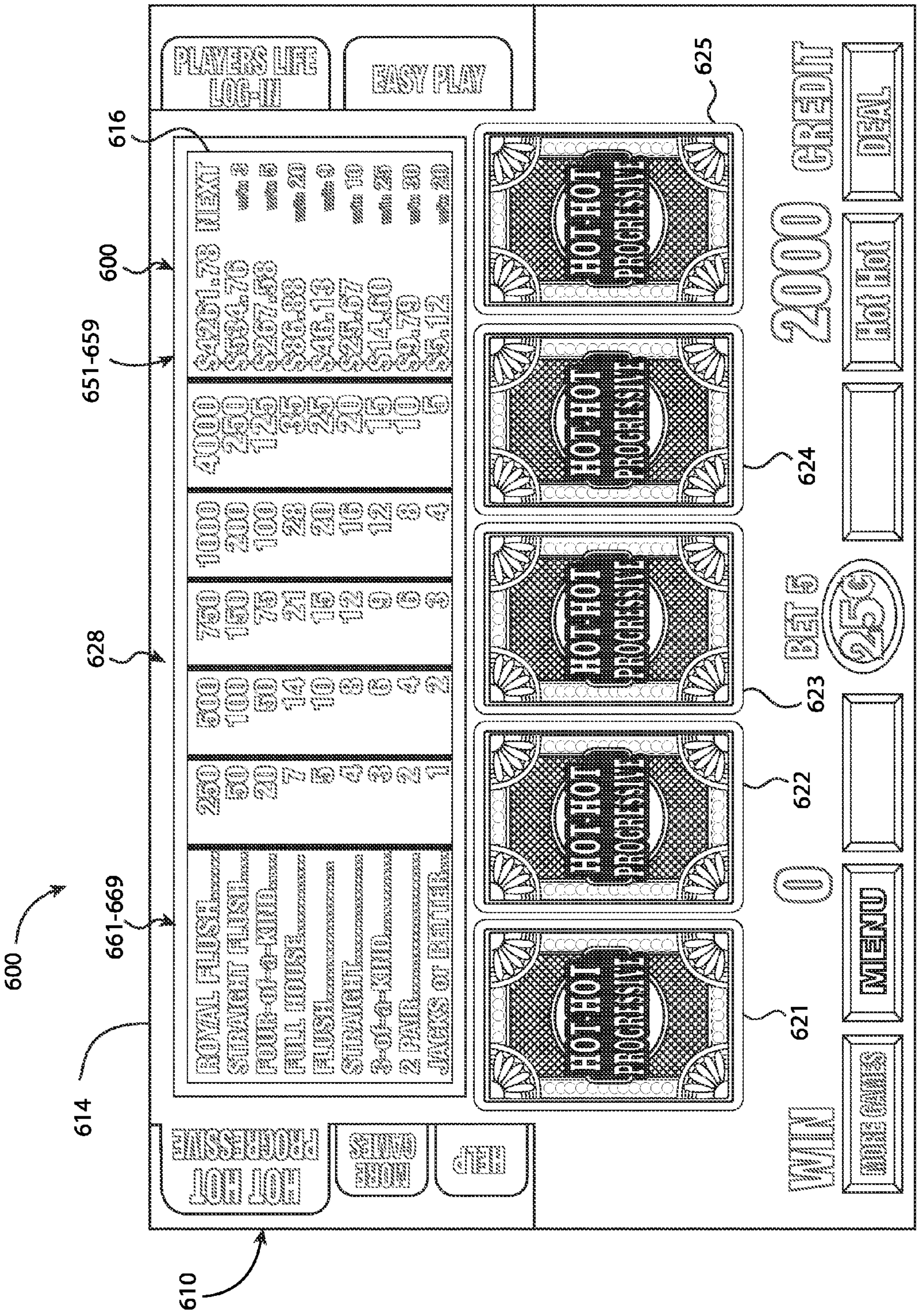
FIG. 13 is a screen shot of a display displaying the exemplary wagering game of FIG. 9 with an informational box indicating the players progress in the exemplary multi-jackpot progressive game of FIG. 11.

FIG. 13 provides a screen shot of the display 614 after numerous plays of the wagering game 630 and HOT HOT Progressive Game 632, with the information box 616 illustrating the increased probability of winning the various progressive awards 651-659. Comparing FIG. 10 and FIG. 13, it can be seen that the probability of winning the first progressive award 651 upon achieving a first symbol-based outcome 661 has increased from 1-in-50 to 1-in-20. Likewise, FIG. 13 illustrates that the probability of winning the second progressive award 652 upon achieving a second symbol-based outcome 662 has increased from 1-in-50 to 1-in-30. FIG. 13 also illustrates that the progressive-values are incremented when a progressive-award-determination sequence is initiated, for example, in response to achieving one of the symbol-based outcomes 661-669, but the corresponding progressive award is not awarded. For example, in comparing FIG. 10 and FIG. 13, it can be seen that the first progressive award 651 amount has increased from $4.00 to $5.12. Likewise, FIG. 13 illustrates that the second progressive award 652 amount has increased from $8.00 to $9.79.

Figure 14:
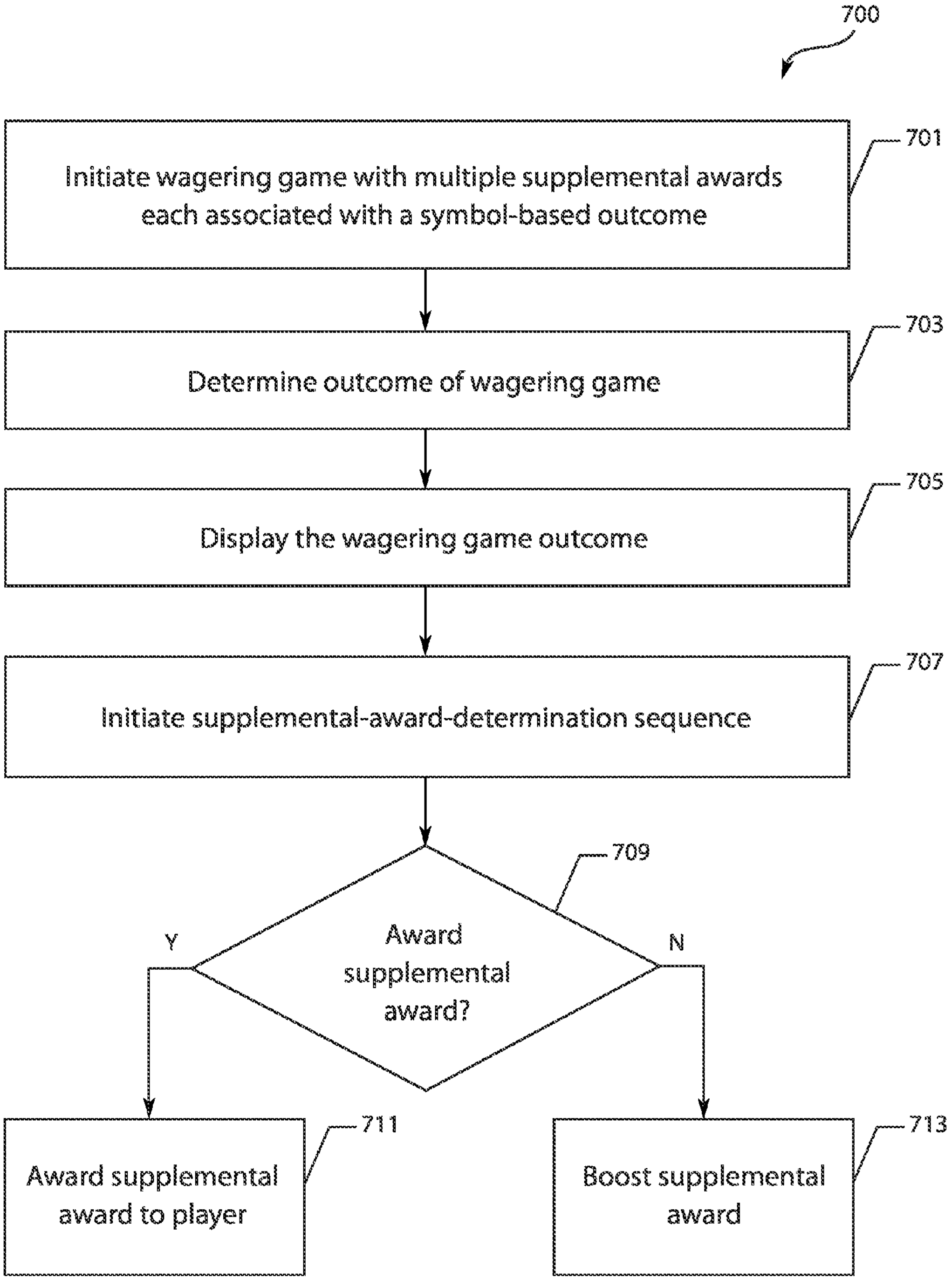
FIG. 14 is a flowchart for an algorithm that corresponds to instructions that can be executed by a controller in accord with at least some aspects of the disclosed concepts.

FIG. 14 represents an algorithm that corresponds to at least some instructions that can be executed, for example, by the controller 42 and/or external systems 46 in FIG. 2 to perform any or all of the above described functions associated with the disclosed concepts. By way of non-limiting example, the exemplary algorithm 700 of FIG. 14 includes, at block 701, initiating a wagering game using, for example, CPU/controller 42 of FIG. 2. The wagering game, such as those wagering games discussed above with respect to FIGS. 5-13, includes one or more supplemental/progressive awards (e.g., 550-559 of FIG. 5), each of which is associated with a symbol-based outcome (e.g., 560-569 of FIG. 5). The supplemental awards each have a respective value.

At block 703, the method 700 includes randomly determining (e.g., via controller 42 of FIG. 2) an outcome of the wagering game. The outcome is determined from a plurality of wagering game outcomes, which includes at least the symbol-based outcomes associated with the one or more supplemental awards. At block 705, one or more displays, such as primary display area 14 and/or secondary display area 16 of FIG. 1, are instructed to display the wagering game outcome. If one or more of the symbol-based outcomes associated with the supplemental awards are displayed as part of the wagering game outcome, the method 700 responds at block 707 by initiating a progressive-award-determination sequence. As described above, the progressive-award-determination sequence determines whether or not to award the award(s) associated with the displayed symbol-based outcome(s). Commensurately, it is determined at block 709 whether or not to award the associated supplemental award. If yes, the associated supplemental award is conferred upon the player, as illustrated at block 711. In response to the award(s) associated with the displayed symbol-based outcome(s) not being awarded, the method 700 responds, in some embodiments, at block 713 by increasing the respective amount of the supplemental or progressive award associated with the displayed symbol-based outcome(s) by a predetermined amount. Optionally, or alternatively, the method 700 can also respond to the award(s) associated with the displayed symbol-based outcome(s) not being awarded by increasing a respective probability of awarding the supplemental or progressive award associated with the displayed symbol-based outcome(s).

In some embodiments, the method 700 includes at least those steps enumerated above. It is also within the scope and spirit of the present disclosure to omit steps, include additional steps, and/or modify the order presented above. It should be further noted that the method represents a single execution of a gaming feature while conducting a wagering game for a player. However, it is expected, as indicated above, that the method be applied in a systematic and repetitive manner.

Figure 15:
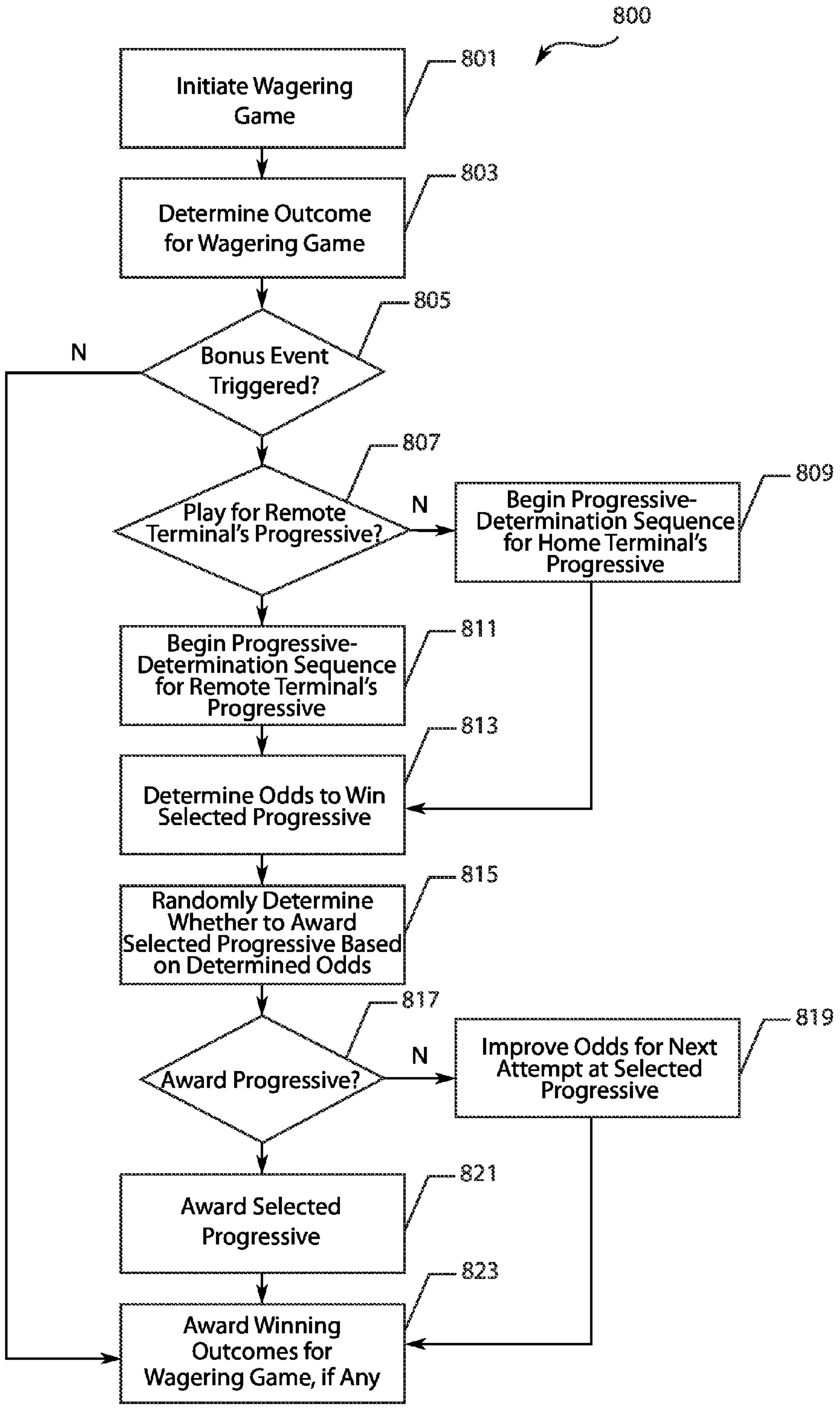
FIG. 15 is a flowchart for an algorithm that corresponds to instructions that can be executed by a controller in accord with at least some aspects of the disclosed concepts.

Turning next to FIG. 15, a flowchart is presented that represents an algorithm that corresponds to at least some instructions that can be executed, for example, by a local controller (e.g., via CPU 42 of FIG. 2) and/or a network controller (e.g., via external system 46 of FIG. 2) to perform any or all of the functions associated with the concepts disclosed herein. In some implementations, FIG. 15 is representative of an optional competitive multiplayer game-play scheme according to embodiments of the present disclosure. By way of non-limiting example, the method 800 represented in FIG. 15 allows for eligible players playing at a gaming device within a bank of gaming devices or on a network of gaming devices to compete for supplemental awards or progressive jackpots that are generally only available on other gaming devices in the bank or on the network. The architecture for, and interaction of, a bank of gaming devices is more fully described in U.S. Pat. No. 7,662,040 B2, to Allon G. Englman et al., which issued on Feb. 16, 2010, and is incorporated herein by reference in its entirety.

An exemplary algorithm 800 begins at block 801, wherein a wagering game is initiated using, for example, CPU/controller 42 of FIG. 2. The wagering game, such as those wagering games discussed above with respect to FIGS. 5-13, includes one or more supplemental/progressive awards (e.g., 550-559 of FIG. 5), each of which is associated with a symbol-based outcome (e.g., 560-569 of FIG. 5). The supplemental awards each have a respective value and a probability of being awarded. Other wagering game configurations are also envisioned.

At block 803, an outcome of the wagering game is randomly determined, e.g., via controller 42 of FIG. 2. The outcome, in some aspects, is determined from a plurality of wagering game outcomes, which includes at least the symbol-based outcomes associated with the one or more supplemental/progressive awards. One or more displays, such as primary display area 14 and/or secondary display area 16 of FIG. 1, can then be instructed by the controller to display the wagering game outcome. If the wagering game outcome corresponds to at least one winning outcome (e.g., includes one or more winning symbol-combinations on an active payline), a payout device, such as payoff mechanism 50 of FIG. 2, is operable to award a corresponding value of credits or other award to the player, for example, in response to instructions from a controller, as indicated in block 823.

At block 805, a determination is made if a bonus event is triggered. By way of illustration, and not limitation, the bonus-triggering event may be a symbol-based trigger, a time-based trigger, a wager-based trigger, a collection-based trigger, etc. In an exemplary implementation, a bonus game is comprised of a predetermined number of free spins on a set of bonus reels in a bonus slot-type game. During the free spins, "progressive symbols" can appear on one or more of the bonus reels. If, during one of the free bonus spins, one or more "progressive symbols" appear in a predetermined manner (e.g., along an active payline, on a predetermined reel or number of reels, as a scatter pay, etc.), a random determination is made whether to award the player with a supplemental or progressive award, in a manner similar to the embodiment described above with respect to FIGS. 5-8, as described in further detail below with respect to block 809. For example, if a specific outcome is achieved and a determination is made that a player has won the award, the award is conferred upon the player. Conversely, if a specific outcome is achieved and a determination is made that a player has not won the supplemental/progressive award, the odds of the player winning that award on the next occurrence of the specific outcome increases for subsequent or successive game play. Various alternatives and modifications are also envisioned without departing from the intended scope and spirit of the present disclosure.

At block 807, the controller determines whether a player at one terminal will play (or compete) for a supplemental/progressive award at a different or remote terminal. Although the term "remote" is used in FIG. 15, it is to be understood that the term "remote" is not limited to geographically distant or isolated gaming devices, but encompasses adjacent gaming devices and could comprise any device, wherever located. In an exemplary implementation, this act can be performed by a network controller for a bank or a network of gaming devices, a controller within a gaming device on the network, by a remotely disposed controller, or any combination thereof. Each gaming machine is operable to present a wagering game with a plurality of progressive awards associated therewith. For example, each of the gaming machines in the bank can have five progressive-jackpot levels associated with a base game or a bonus game. According to an exemplary implementation, which can be triggered from a bonus game or a base game, the player at a first gaming device will play for one or more of the progressive awards at a different gaming device if a first predetermined symbol appears concurrently with a second predetermined symbol as part of a wagering game outcome at the first gaming device. Alternatively, the player at a first gaming device will play for one or more of the progressive awards at a different gaming device if a first predetermined symbol appears on a first preselected reel concurrently with a second predetermined symbol appearing on a second preselected reel as part of a bonus game outcome. Other options and variations are also available. Some aspects include each gaming machine in the bank contributing coin-in funds to the progressive-jackpot awards of the other gaming machines within the bank.

If it is determined that a player at one terminal will not play (or compete) for a supplemental/progressive award at a different or remote terminal (i.e., block 807=No), block 809 includes determining if a specific outcome was achieved, whether during the base game or bonus game, that triggers a random determination of whether to award the player with one or more of the supplemental/progressive awards available on their own gaming machine. In particular, a progressive-award-determination sequence is initiated at block 811 responsive to the "no" outcome in block 809. For example, as noted above, a controller determines an outcome of the wagering game and, optionally, displays the wagering game outcome at block 803. If a bonus-triggering event occurs during the play of the base game, a bonus game is initiated, for example, by awarding the player with a predetermined number of spins on a set of bonus reels. If a predetermined number of "progressive symbols" (e.g., four or more symbols) appear scattered on the reels as part of a free bonus spin outcome, the progressive-award-determination sequence is initiated to determine whether or not to award the progressive award(s) associated with the displayed "progressive symbols." The progressive-award-determination sequence can operate, by way of example, as described above with respect to FIGS. 5-14.

In addition to block 809, or as an alternative to block 809 in some implementations, block 811 includes initiating a progressive-award-determination sequence to determine whether or not the player at one gaming device wins one or more of the supplemental/progressive awards associated with another gaming device or gaming devices. In an exemplary implementation, each of the progressive awards at a gaming device is "linked" to a section of a game-theme related structure, such as a castle, ship, etc. In a representative implementation, for example, a first progressive award is linked to a first tower of the castle, a second progressive award is linked to a second tower, a third progressive award is linked to a third tower, a fourth progressive award is linked to a fourth tower, and a fifth progressive award is linked to a draw bridge of the castle. Although not necessarily required, the fifth progressive award is the largest of the five progressive awards. Continuing with the above example, the controller determines whether a player at one terminal will play for a supplemental/progressive award at a different terminal at block 807. When play (or competition) is initiated at block 811, the triggering player is allotted one or more "shots" from a catapult at the castle of the other gaming device. The catapult shot can hit one of the four towers or the drawbridge of the castle at the other gaming device(s).

At block 813, the controller determines the odds of winning the progressive award associated with the section of the castle hit by the catapult shot. At block 815, it is randomly determined whether or not to award the supplemental/progressive award based, at least in part, on the odds determined at block 813. If the progressive-award-determination sequence determines, at block 815, that the player at the gaming device wins one of the supplemental/progressive awards from the other gaming device(s) (i.e., block 817=yes), such event can be visualized by showing the "hit" portion of the castle being knocked down or otherwise destroyed. It is also possible to visualize the winning of the supplemental/progressive awards from the other gaming device in alternative manners (e.g., showing a white, surrender flag being raised from the castle). The progressive award is then provided to the player at block 821 and, optionally, the progressive award value is reset to a predetermined initial value.

If the progressive-award-determination sequence determines, at block 817, that the player at the gaming device does not win the supplemental/progressive awards from the other gaming device (i.e., block 817=no), the method 800 responds at block 819 by increasing the probability that that supplemental/progressive award will be awarded on the next attempt. According to some embodiments, each of the progressive awards are guaranteed to be awarded within a fixed number of "hits" from a catapult, whether the hits are from the gaming device where the castle resides, another gaming device competing for the progressive award, or a combination of both. With each non-progressive-awarding hit, that portion of the castle can show damage to visualize the increased probability that that supplemental/progressive award will be awarded on the next attempt.

In some embodiments, the method 800 includes at least those steps enumerated above. It is also within the scope and spirit of the present disclosure to omit steps, include additional steps, and/or modify the order presented above. It should be further noted that the method represents a single execution of a gaming feature while conducting a wagering game for a player. However, it is expected, as indicated above, that the method be applied in a systematic and repetitive manner.

While many preferred embodiments and best modes for carrying out the present invention have been described in detail above, those familiar with the art to which this disclosure relates will recognize various alternative designs and embodiments for practicing the invention within the scope of the appended claims.

The invention claimed is:

1. A computer-implemented method of conducting a wagering game having a multi-player bonus feature, the method comprising:

detecting, via an input device on a first gaming terminal, a physical item associated with a monetary value, the monetary value establishing a credit balance that changes based on play of the wagering game at the first gaming terminal;

receiving, at the first gaming terminal, an input indicative of a wager to initiate the wagering game on the first gaming terminal, the wager being deducted from the credit balance;

in response to randomly selecting, via at least one of one or more processors, a bonus feature trigger during the wagering game on the first gaming terminal, initiating a play of the multi-player bonus feature on the first gaming terminal;

in response to achieving a first bonus outcome during the play of the multi-player bonus feature, determining, via at least one of the one or more processors, whether to award a first bonus award selected from a plurality of bonus awards associated with the first gaming terminal or to increase a probability of awarding the first bonus award in a subsequent play of the multi-player bonus feature; and in response to achieving a second, different bonus outcome during the play of the multi-player bonus feature, determining, via at least one of the one or more processors, whether to award a second bonus award selected from a plurality of bonus awards primarily available in response to a first bonus outcome achieved during play at a second, different gaming terminal or to increase a probability of awarding the second, different bonus award in a subsequent play of the multi-player bonus feature at the first gaming terminal.

2. The method of claim 1, wherein awarding either of the first bonus award or the second bonus award includes setting the probability of winning the respective first or second bonus award to a non-zero default probability.

3. The method of claim 1, wherein at least one of the first and second bonus awards is a progressive award, and further wherein awarding the at least one of the first and second bonus awards includes resetting the respective progressive award value to a predetermined, non-zero initial value.

4. The method of claim 1, further comprising displaying a visual indication of a current probability of awarding at least one of the first and second bonus awards.

5. The method of claim 1, wherein the first bonus outcome includes displaying one or more designated bonus symbols, and wherein the displayed one or more designated bonus symbols determine which of the plurality of awards associated with the first gaming terminal is the first bonus award.

6. The method of claim 1, wherein determining whether to award the second bonus award includes randomly determining, via at least one of the one or more processors, whether to award the second bonus award.

7. The method of claim 1, wherein determining whether to award the second bonus award includes starting a catapult sequence on the first gaming terminal in which a catapult shoots at a structure displayed on the second gaming terminal, and wherein the second bonus award is awarded if the structure is knocked down or destroyed by the catapult shot.

8. The method of claim 1, wherein the first bonus must be awarded on the next first bonus outcome after achieving a predetermined number of first bonus outcomes.

9. A gaming system configured to conduct a wagering game having a multi-player bonus feature, the gaming system comprising:

one or more processors; and one or more memory devices storing instructions that, when executed by at least one of the one or more processors, cause the gaming system to:

detect, via at least one of one or more input devices on a first gaming terminal, a physical item associated with a monetary value, the monetary value establishing a credit balance that changes based on play of the wagering game at the first gaming terminal;

receive, at the first gaming terminal, an input indicative of a wager to initiate the wagering game on the first gaming terminal, the wager being deducted from the credit balance;

randomly select a game outcome from a plurality of possible outcomes of the wagering game;

in response to the selected game outcome including a bonus feature trigger, initiate a play of the multi-player bonus feature on the first gaming terminal;

in response to achieving a first bonus outcome during the play of the multi-player bonus feature, determine whether to award a first bonus award selected from a plurality of bonus awards associated with the first gaming terminal;

in response to achieving a second, different bonus outcome during the play of the multi-player, determine whether to award a second bonus award selected from a plurality of bonus awards primarily available in response to a first bonus outcome achieved during play at a second, different gaming terminal;

in response to failing to award the first bonus award, increase a probability of awarding the first bonus award in a subsequent play of the multi-player bonus feature; and in response to failing to award the second bonus award, increase a probability of awarding the second bonus award in a subsequent play of the multi-player bonus feature on the first gaming terminal.

10. The gaming system of claim 9, wherein the bonus feature trigger is a mystery trigger.

11. The gaming system of claim 9, wherein the bonus feature includes one or more free spins of a plurality of reels displayed on at least one of one or more display devices of the gaming system.

12. The gaming system of claim 9, wherein the first bonus outcome determines which bonus award of the plurality of bonus awards associated with the first gaming terminal is the first bonus award.

13. The gaming system of claim 9, wherein the first bonus outcome includes displaying one or more designated bonus symbols, and wherein the displayed one or more designated bonus symbols determine which bonus award of the plurality of bonus awards associated with the first gaming terminal is the first bonus award.

14. The gaming system of claim 9, wherein the second bonus outcome starts a catapult sequence in which a catapult shoots at a structure displayed on the second gaming terminal.

15. The gaming system of claim 14, wherein the second bonus award must be awarded on the next catapult shot outcome after the structure receives predetermined number of catapult shots.

16. A gaming system for conducting wagering game having a multi-player bonus feature, the gaming system comprising:

a first, a second, and a third gaming terminal;

a random element generator configured to generate one or more random elements; and one or more processors configured to:

detect, via an electronic input device on the first gaming terminal, a physical item associated with a monetary value, the monetary value establishing a credit balance that changes based on play of the wagering game at the first gaming terminal;

receive, at the first gaming terminal, an input indicative of a wager to initiate the wagering game on the first gaming terminal, the wager being deducted from the credit balance;

select, based, at least in part, on the one or more random elements, a game outcome from a plurality of possible outcome of the wagering game;

in response to the selected game outcome including a bonus feature trigger, initiate a play of the multi-player bonus feature on the first gaming terminal;

in response to receiving a first bonus outcome during the play of the multi-player bonus feature, determine whether to award a first bonus award selected from a plurality of bonus awards associated with the first gaming terminal;

in response to achieving a second, different bonus outcome during the play of the multiplayer bonus feature, determine whether to award a second, different bonus award selected from a plurality of bonus awards primarily available in response to a first bonus outcome achieved during play at the second gaming terminal;

in response to failing to award the first bonus award, increase a probability of awarding the first bonus award in a subsequent play of the multi-player bonus feature; and in response to failing to award the second bonus award, increase a probability of awarding the second bonus award to either of the first and third gaming terminals in a subsequent play of the multi-player bonus feature.

17. The gaming system of claim 16, wherein the bonus feature trigger is a mystery trigger.

18. The gaming system of claim 16, wherein the multi-player bonus feature includes one or more free spins of a plurality of reels displayed on an electronic display device of the gaming system.

19. The gaming system of claim 16, wherein the first bonus outcome determines which bonus award of the plurality of bonus awards associated with the first gaming terminal is the first bonus award.

20. The gaming system of claim 16, wherein the first bonus outcome includes displaying one or more designated bonus symbols, and wherein the displayed one or more designated bonus symbols determine which bonus award of the plurality of bonus awards associated with the first gaming terminal is the first bonus award.

* * * * *